(12) United States Patent
Lapointe et al.

(10) Patent No.: US 10,528,953 B2
(45) Date of Patent: Jan. 7, 2020

(54) METHODS AND SYSTEM FOR PASSIVATION MEASUREMENTS AND MANAGEMENT

(71) Applicant: WALTER SURFACE TECHNOLOGIES INC., Pointe-Claire (CA)

(72) Inventors: Patrick Lapointe, Montreal (CA); Pierre Somers, Montreal (CA)

(73) Assignee: WALTER SURFACE TECHNOLOGIES INC., Quebec (CA)

( * ) Notice: Subject to any disclaimer, the term of this patent is extended or adjusted under 35 U.S.C. 154(b) by 0 days.

(21) Appl. No.: 15/324,557

(22) PCT Filed: Jun. 25, 2015

(86) PCT No.: PCT/CA2015/050593
§ 371 (c)(1),
(2) Date: Jan. 6, 2017

(87) PCT Pub. No.: WO2016/004523
PCT Pub. Date: Jan. 14, 2016

(65) Prior Publication Data
US 2017/0200166 A1    Jul. 13, 2017

Related U.S. Application Data

(60) Provisional application No. 62/021,575, filed on Jul. 7, 2014.

(51) Int. Cl.
*B23K 31/00* (2006.01)
*G06Q 30/00* (2012.01)
*B23K 31/02* (2006.01)
*B23K 31/12* (2006.01)
*B23K 101/06* (2006.01)
*B23K 103/04* (2006.01)

(52) U.S. Cl.
CPC ............. *G06Q 30/01* (2013.01); *B23K 31/02* (2013.01); *B23K 31/125* (2013.01); *B23K 2101/06* (2018.08); *B23K 2103/05* (2018.08)

(58) Field of Classification Search
CPC .................................................... B23K 31/125
See application file for complete search history.

(56) References Cited

U.S. PATENT DOCUMENTS 8,544,714 B1    10/2013  Obaditch et al.
2002/0022775 A1*  2/2002  Finkelshteins ....... A61B 5/0008
                                                              600/300

(Continued)

OTHER PUBLICATIONS

International Search Report dated Aug. 27, 2015 in connection with PCT Patent Application No. PCT/CA2015/050593, 3 pages.

(Continued)

*Primary Examiner* — Grace Park

(57) ABSTRACT

A method for manufacturing a workpiece including a first metallic component and a second metallic component, the method comprising: welding the first metallic component to the second metallic component; performing passivation measurements on the workpiece at a plurality of spaced apart locations; creating a record of the passivation measurements on a server arrangement; making the record created in the server arrangement available to a purchaser of the workpiece.

17 Claims, 16 Drawing Sheets

(56) References Cited

U.S. PATENT DOCUMENTS

| | | | | |
|---|---|---|---|---|
| 2008/0119702 | A1* | 5/2008 | Reggiardo | A61B 5/14532 600/345 |
| 2008/0252311 | A1* | 10/2008 | Koh | G01R 31/2806 324/754.08 |
| 2012/0193330 | A1 | 8/2012 | Edwards, II et al. | |
| 2013/0149775 | A1* | 6/2013 | Williams | G01N 21/75 435/287.2 |
| 2015/0122781 | A1* | 5/2015 | Albrecht | B23K 9/0953 219/73 |

OTHER PUBLICATIONS

Written Opinion dated Aug. 27, 2015 in connection with PCT Patent Application No. PCT/CA2015/050593, 5 pages.

McManus, "Testing and Experience of Metallic Components in Subsea Hydraulic Control Fluids",Marine Corrosion Forum, Oct. 2007 technical presentations, Section 4.1, Subsection 4.2, 5 pages.

\* cited by examiner

SURFOX™

My Account | Sign Out

| Customers | Contacts | Projects | Testers | Machines | Certification |

← Back  Tests

Sink  Sink
Description  + Enter new test name
[Weld sink and test passivation levels]
Save
Stainless Steel Grade
[Stainless steel grade 1]

Contact
[John Doe]

2002

2000
[Print] [Upload Photo] [Save]

FIG. 20

METHODS AND SYSTEM FOR PASSIVATION MEASUREMENTS AND MANAGEMENT

FIELD OF THE INVENTION

The invention generally relates to a system and its methods for the management of passivation measurements.

BACKGROUND

Certain metals, such as stainless steel that are naturally corrosion resistant may still be susceptible to corrosion or oxidization when the protective oxide layer which isolates the base metal from the oxygen environment is lost. When stainless steel is welded, the Chromium oxide layer in the area of the weld is destroyed. Over time and under proper conditions, the oxide layer grows back, however, the degree of growth depends on the metal surface cleanliness. The welding operation, as well as exposure to free iron particles in the air, or contact with abrasive products, usually leaves deposits that prevent or at least interfere with the growth of the oxide layer.

It is common procedure to clean the weld and remove impurities to promote the growth of the oxide layer and thus help rebuild the passive layer around the weld. However, the cleaning operation is time-consuming, costly and usually involves a chemical treatment such as the application of an acid in combination with an electric current that chemically dissolves the outer metallic layer in the weld area to expose the base metal and promote the regeneration of the oxide layer over a period of typically 24 to 48 hours.

Once the welding and the passivation operation have been completed it is generally impossible to see with the naked eye whether the nanometer-thick oxide layer has properly regrown on the weld and in the adjacent areas. Sometimes, if the passivation operation has not been properly performed, the weld can corrode over time, especially if the material is exposed to a highly corrosive environment in use, or to free iron particles in suspension in the air.

Therefore, given the relatively high costs of stainless steel raw material and transformation processes, there is a need in the industry to determine if a weld or another area of a metal object has been properly passivated and to record the passivation measurements in a file to be able to subsequently demonstrate that all the necessary quality control process steps have been performed during the manufacturing of the metal object.

SUMMARY OF THE INVENTION

As embodied and broadly described herein, the invention provides a method for manufacturing a workpiece including a first metallic component and a second metallic component. The method comprises welding the first metallic component to the second metallic component and performing passivation measurements on the workpiece at a plurality of spaced apart locations. The method further includes creating a record of the passivation measurements on a server arrangement and making the record stored in the server arrangement available to a purchaser of the workpiece.

In a specific example of implementation, the record includes a graphical representation of one or more components of the workpiece and also includes data indicative of locations on the graphical representation at which the passivation measurements have been taken.

In a second broad aspect, the invention provides an online storage system for passivation measurements, the online storage system including a server arrangement comprising a Central Processing Unit (CPU) and a machine readable storage encoded with non-transitory program. The non-transitory program is configured to receive as an input data conveying a plurality of passivation measurements performed on a workpiece and a workpiece identifier. The program is further configured to generate a record on the basis of the passivation measurements and the workpiece identifier and store the record in the machine-readable storage. The program is further configured to respond to a request from a remote client device requesting access to the record to generate and send a message to the remote client device, the message conveying passivation information derived from the record.

In a specific and non-limiting example of implementation, the online storage system stores a graphical representation of the workpiece along with location information identifying locations on the workpiece at which passivation measurements have been taken.

In a third broad aspect, the invention provides a computer readable storage device encoded with non-transitory software for execution by a Central Processing Unit (CPU). The software is configured to communicate with a remote passivation measurement device to receive from the passivation measurement device passivation measurements and to implement a Graphical User Interface (GUI), including a workspace to receive a graphical representation of a workpiece, the workspace being configured to display one or more markers, each marker indicative of a location on the workpiece with which a passivation measurement is to be associated. In response to reception of a passivation measurement from the remote passivation measurement device, the software is configured to associate the passivation measurement with the marker.

In a specific and non-limiting example of implementation, the GUI includes a control component responsive to user input to place a marker at a selected location of the graphical representation of the workpiece. Advantageously, the control component is responsive to multiple user inputs to place a plurality of markers at selected locations of the graphical representation of the workpiece.

An optional characteristic of the software is the generation of a notification to a user to retest the passivation of the workpiece after a certain time period has expired after a previous test has been made.

Another optional characteristic of the software is the validation procedure to validate the operation of the passivation measurement device. The validation procedure includes checking a battery level of the passivation measurement device, prompting a user of the passivation measurement device to confirm that a sensing tip of the passivation measurement device is saturated with liquid and clean, and further prompt the user of the passivation measurement device to make a passivation measurement on a negative reference plate and on a positive reference plate.

BRIEF DESCRIPTION OF THE DRAWINGS

The various embodiments of the present invention are defined below, by way of example only, with reference to the accompanying drawings, in which:

FIGS. 17 to 22 illustrate examples of screen shots of the passivation measurement processing entity.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS OF THE INVENTION

Corrosion resistant metals such as a stainless steel are commonly used in the manufacture of commercial and industrial products. Often, the manufacturing operation involves welding separate stainless steel pieces into a more complex assembly. The heat from the welding operation removes the metal oxide passivation layer and exposes the base metal. As such, the passivation of the product needs to be restored after welding to avoid premature corrosion.

The present invention makes it possible to collect information about the passivation status of a welded product and to record that information in a file that can be used for reference purposes. In this fashion, the manufacturer of the welded product can document the passivation process to demonstrate to the purchaser that all the quality control steps during the manufacturing operation have been complied with.

Figure 1:
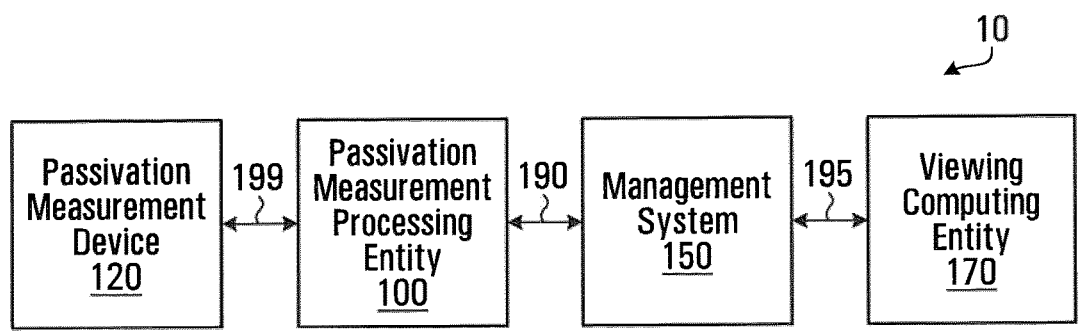
FIG. 1 is a block diagram of a passivation measurement and management system in which embodiments of the invention may be implemented.

FIG. 1 is a block diagram of a passivation measurement and management system 10 in which embodiments of the invention may be implemented. In some embodiments, the measurement and management system 10 comprises a passivation measurement device 120, a passivation measurement processing entity 100, a management system 150, and a viewing computing entity 170.

For instance, the passivation measurement device 120 may be a portable or non-portable electronic device. More specifically, the passivation measurement device 120 is used to take passivation measurements of a metal product or work-piece of the metal product to determine if the metal product or component is passivated and/or the degree of passivation at one or more measuring points of the metal product or component.

In this example, the passivation measurement device 120 is connected to the passivation measurement processing entity 100 over the connection 199. The connection 199 may be a wired or wireless connection. For example, the connection 199 may be a wireless connection over Bluetooth™, UWB™, ZigBee™, Wi-Fi™, or using any other data communication protocol.

The passivation measurement processing entity 100 may be any type of computing entity, such as one or more stand-alone computers, servers, cell phones, tablets or any other generally portable or non-portable computing device. The computing entity is programmed with suitable software, which is executed by a CPU (central processing unit). The execution of the software provides the desired functionality to the passivation measurement processing entity 100. The passivation measurement processing entity 100 is used in conjunction with the passivation measurement device 120 in the process of taking measurements with the passivation measurement device 120, as it will be discussed in detail later.

In a specific example, the passivation measurement processing entity 100 communicates with the management system 150 over a data network connection 190. The data network connection 190 may be an Internet, WAN, LAN connection, or any other suitable connection.

The management system 150 is implemented by any type of computing entity, such as one or more stand-alone servers, computers, cell phones, tablets or any other generally portable or non-portable computing device. For example, this configuration may allow for measurements taken with the passivation measurement device 120 that is processed by the passivation measurement processing entity 100 to later be communicated to the management system 150 which can then be stored on the management system 150.

The management system 150 further connects to the viewing computing entity 170 over a data network connection 195. The data network connection 195 may be an Internet, WAN, LAN connection, or any other suitable connection.

The viewing computing entity 170 may be any type of computing entity, such as one or more stand-alone computers, servers, cell phones, tablets or any other generally portable or non-portable computing device. For example, a user at the viewing computing entity 170 may interact with the computing entity 170 to review and/or interact with the measurements stored on the management system 150 or to make a request for measurements to be done.

The passivation measurement device, the passivation measurement processing entity, the management system, and the viewing computing entity will now be discussed in greater detail.

The Passivation Measurement Device

Figure 2:
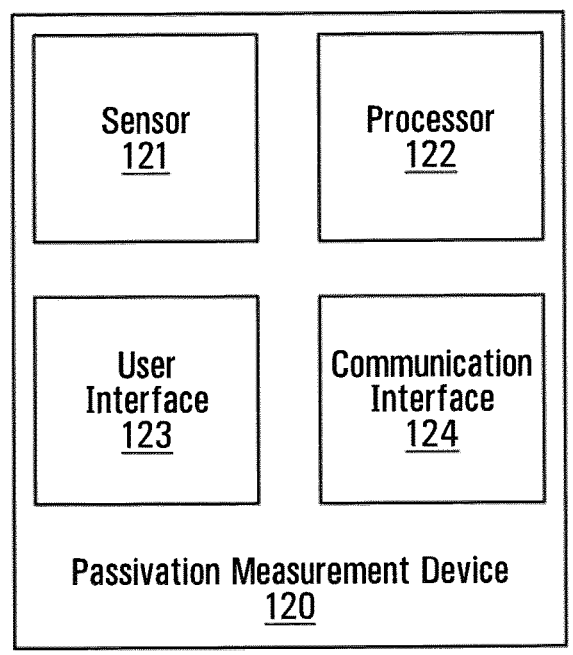
FIG. 2 is a block diagram of a passivation measurement device.

FIG. 2 is a block diagram of the passivation measurement device 120. As shown, the passivation measurement device 120 comprises a sensor 121, a data processor 122, a user interface 123, and a communication interface 124. The sensor 121, the processor 122, the user interface 123, and the communication interface 124 communicate with one another over one or more data buses (e.g., via electronic circuitry on an electronic board) that are not shown in the drawing for clarity. The passivation measurement device 120 may also include a battery, which is not shown in the drawing.

The passivation reading(s) or measurements(s) is (are) typically taken at one (or more) specific location(s) of a work-piece. To do so, a technician places the sensor's at least two tips, one acting as an electric ground and the other(s) as probe contact point(s) for that point's passivation measurement, all in good electrical contact with the work-piece. In one embodiment, the sensor 121 measures the potential (voltage) difference between the ground and the probe's contact point(s) with the work-piece (e.g. stainless steel) relative to a well-defined reference potential difference contained within the Passivation Measuring Device 120. The probe contact point(s) can be placed anywhere on the work-piece but are specifically useful in areas where passivation may have changed due to, one or another, physical or chemical treatment: for example testing for passivation at points along a welding joint.

The data processor 122 (which by way of example in one embodiment contains analog-to-digital converters and a CPU), is connected to the sensor 122 and converts the analog results of measurement(s) into a digital voltage value(s) of the probe's contact point(s) and further processes said results to determine the degree of passivation. A positive voltage measurement between the positive side of zero to +2.0 volts, in one embodiment, indicates a reasonable value of passivation whilst a hard zero indicates a pure insulation surface and a negative voltage number below the negative side of zero indicates non-passivation of the surface at the probe's contact point(s).

In some embodiments, the sensor's internal circuitry in 121 may include a voltmeter in another embodiment a self-regulating balanced zero current bridge may be used to estimate the potential difference between a ground and any probe's test point.

Although the example given above measures voltage to determine passivation, other possible ways to determine passivation may include measuring resistance, current and/or impedance. For example, in alternative embodiments, an electrical voltage could be impressed across the tips of the sensor 121 to measure the resulting current flow between the conductive tips and through the workpiece surface in order to determine the resistance and/or impedance.

The user interface 123 can take various forms and, in some embodiments, it is a graphical user interface (GUI). In this case, the GUI includes means to deliver visually information to the user, such as a display. The GUI may also include graphical tools allowing the user to make selections and input commands, such as a touch screen. In other cases, the user interface does not include means to deliver visually information to the user (i.e., in other cases a display is not used). The user interface 105 may also include buttons allowing the user to make selections and input commands. The user's selections and input commands may then be directed to the one or more data bus such that signals corresponding to the user's selections or input commands can be processed by the processor 122. For example, the user interface 123 may be used to: setup or configure or calibrate the passivation measurement device 120 prior to taking a measurement, to show the passivation measurement results, and/or indicate that a successful or unsuccessful measurement has been taken.

In this example, the passivation measurement device 120 is connected by the communication interface 124 to the passivation measurement processing entity 100 over the connection 199. By way of example, the communication interface 124 may be a Bluetooth™, UWB™, ZigBee™ or Wi-Fi™ transmitter/receiver. The communication interface 124 may allow for information such as passivation measurement data or test results to be transmitted from the passivation measurement device 120 to the passivation measurement processing entity 100 and/or may also be used to receive instructions or settings from the passivation measurement processing entity 100. Furthermore, the passivation measurement processing entity 100 may be used in combination with the passivation measurement device 120 in the process of taking passivation measurements with the passivation measurement device 120 and/or may be used in combination with the passivation measurement device 120 to configure or calibrate the passivation measurement device 120.

The Passivation Measurement Processing Entity

Figure 3:
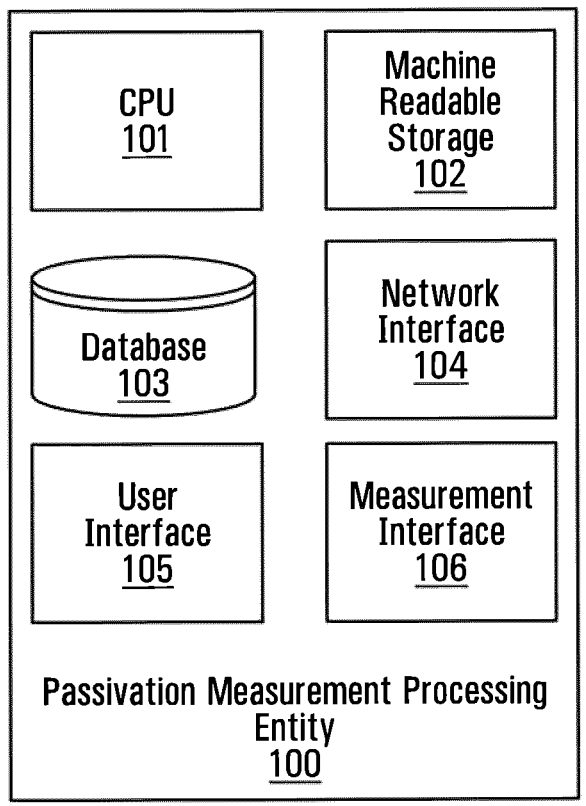
FIG. 3 is a block diagram of a passivation measurement computing entity.

FIG. 3 is a block diagram of the passivation measurement processing entity 100. In the embodiment of FIG. 3, the passivation measurement processing entity 100 comprises a CPU 101, machine-readable storage 102, a database 103, a network interface 104, a user interface 105 and a passivation measurement interface 106. In this embodiment, the CPU 101, machine readable storage 102, the database 103, the network interface 104, the user interface 105 and the passivation measurement interface 106 may communicate with one another over one or more data buses, not shown for clarity. Furthermore, the passivation measurement processing entity 100 may also be running an operating system.

The machine-readable storage 102 can take various forms and it is designed to store program code for execution by the CPU 101. Typically, the machine-readable storage 102 is designed to retain data in a permanent fashion such that when power is turned off, the data will not be lost. For instance, the machine-readable storage 102 may be used to store execute program code that: interacts with the passivation measurement device 120; interacts with a user through the user interface 105; and/or runs passivation testing or measurement software.

The database 103 can take various forms and it is designed to store data, which may be retrieved by the CPU 101 as part of the execution of the stored program code. Similarly, data may be stored in the database 103 by the CPU 101 as part of the execution of the stored program code. Typically, the database 103 is designed to retain data in a permanent fashion such that when power is turned off, the data will not be lost. Furthermore, the database 103 may comprise one or more databases. For example, the database 103 may store: measurement results or data obtained from the passivation measurement device 120; work-piece profiles associated with the work piece tested with the passivation measurement device 120; work files relating job that requires passivation testing; calibration information and schedule associated with the passivation measurement device 120 and/or other information pertaining to the passivation measurement device 120. In other embodiments, the passivation measurement processing entity 100 does not have a database. In other words, the database 103 illustrated in FIG. 3 is optional. It will be appreciated that in embodiments where the passivation measurement processing entity 100 does not have a database, relevant data and information would be stored in the database of the management system 150.

The network interface 104 can take various forms and it is used to connect to the data network connection 190 to communicate with the management system 150. For example, the network interface 104 may be a network interface card or device, such as an Ethernet™ card or a Wi-Fi™ card. In a specific and non-limiting example, the data network connection 190 is the Internet and the network interface 104 connects to a router, hub and/or modem (not depicted) in order to access the Internet. In other embodiments, the network interface 104 may be a transmitter/receiver that connects to a cellular network (e.g., 3G, 4G, LTE™, 3GPP™, EDGE™, or WiMax™ transmitter/receiver) which then allows the passivation measurement processing entity 100 to access the Internet.

The user interface 105 can take various forms and, in some embodiments, it is a graphical user interface (GUI). In this case, the GUI includes means to deliver visual information to the user, such as a display or a monitor. The GUI may also include graphical tools allowing the user to make selections and input commands, such as a touch screen. The user interface 105 may also include an input means such as buttons, a keyboard and/or mouse allowing the user to make selections and input commands. The user's selections and input commands may then be directed to the one or more data bus such that the CPU 101 can process those signals.

For example, the passivation testing software running on the passivation measurement processing entity 100 may display on the GUI of the user interface 105 a work-piece or a part of a work-piece being tested where the work-piece or part of the work-piece being displayed is obtained from a workpiece profile associated with the work-piece being tested. Furthermore, the work-piece or part of the work-piece being displayed may be selected by user interaction with the user interface 105, by for example, through a keyboard and/or mouse, or a photo camera or video.

The passivation testing software may in addition be used to provide guidance to the user when performing passivation measurements. For example, the user interface 105 can display to the user a graphical representation of the work piece that is to be tested. The display includes a workspace configured to display markers, each marker identifying the location on the work piece on which a passivation measurement is to be made (e.g., test points). The markers may be indicated by pins on the image of the work piece, which may be set by the user. The location on which the passivation measurement is to be made can be dynamically shown or it can be static. In a static form of implementation, the display shows all the locations on the work piece on which a measurement is to be made. In the case of a dynamic display, the software is configured to sequentially identify the locations, such as showing them to the user one by one; when a passivation measurement associated with the currently identified location is received, then the next location is designated on the screen to guide the user in generating a complete passivation measurement map for the work piece.

A dynamic display that guides the operator has the advantage of providing consistency from one workpiece to the other. In this fashion, each workpiece being tested is subjected to the same testing protocol, where the measurements are made at the same locations of the piece.

The passivation measurement interface 106 can take various forms and it is used to connect to or communicate with the passivation measurement device 120 over the connection 199. As discussed above, the connection 199 may be a wired or wireless connection. For example, the passivation measurement interface 106 may allow for information such as passivation measurement data or test results to be communicated from the passivation measurement device 120 to the passivation measurement processing entity 100. Furthermore, the passivation measurement interface 106 may allow for information such as configuration data to be communicated from the passivation measurement processing entity 100 to the passivation measurement device 120.

The configuration data can be used to properly set the passivation measurement device 120 for proper measurements. The setting of the passivation measurement device 120 can vary depending on the particular job to be performed, such as the specific alloy that is being tested, the work piece geometry, etc. One example of the setting that can be changed by the passivation measurement device 120 is the adaptation of the sensor 121 for a particular job. A certain output of the sensor 121 for certain alloys may indicate a satisfactory passivation while the same output for other alloys may be indicative of an insufficient passivation. By dynamically changing the setting of the sensor 121 to fit the parameters of the passivation-testing job that is being performed, more precise measurements can be obtained.

By way of a non-limiting example, the passivation measurement processing entity 100 may be a cell phone or tablet, which downloads an application from a server (e.g., an application store). The downloaded application is installed on to the cell phone or tablet (i.e., the passivation measurement processing entity 100). Such application would allow a user to interact with the passivation measurement device 120 and the management system 150. For instance, the application may communicate via Bluetooth™ to the passivation measurement device 120 and the application may communicate via Wi-Fi™ (or a cellular network protocol, if Wi-Fi™ is not available) to access the Internet in order to communicate with the management system 150. The application would then allow the user to select a work piece or take a photo (via the camera of the cell phone or tablet) of a work piece and add test points to the work piece. A test point designates a location at which a measurement is made. Then, measurements taken with the passivation measurement device 120 can be shown on the GUI of the passivation measurement processing entity 100 and stored in the database of the management system 150, for each of the test point. The association between the test points, the passivation measurement and the graphical representation of the workpiece creates a complete record of the workpiece that can be used to provide evidence that the workpiece was adequately tested during manufacturing and what the results of the tests where. That information can also be used to adapt the manufacturing process in the event consistent failures of the workpiece are noted during use. For instance, if it becomes apparent that the population of workpieces in the field develop corrosion at a certain location, the manufacturer may be able to determine on the basis of the records of the workpieces if the level of passivation at that location was within the specifications and in the affirmative, the manufacturer may then revise the specifications to require a higher degree of passivation at that critical location.

The Management System

Figure 4:
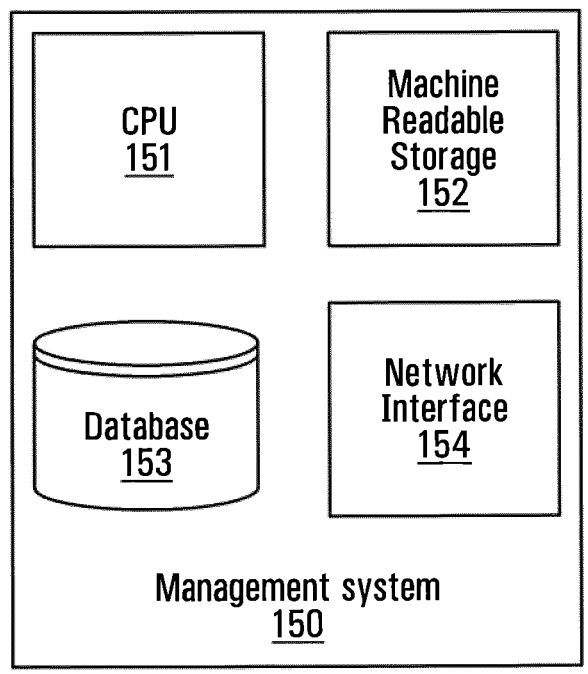
FIG. 4 is a block diagram of a system for managing passivation measurements.

FIG. 4 is a block diagram of the management system. In this embodiment, the management system 150 comprises a CPU 151, machine-readable storage 152, a database 153, and a network interface 154. The CPU 151, machine readable storage 152, the database 153, and the network interface 154 can take various forms and may function in a similar manner as the CPU 101, machine readable storage 102, the database 103 and the network interface 104, respectively.

In particular, the database 153 can take various forms and it is designed to store data, which may be retrieved by the CPU 151 as part of the execution of the stored program code. Similarly, data may be stored in the database 153 by the CPU 151 as part of the execution of the stored program code. Typically, the database 153 is designed to retain data in a permanent fashion such that when power is turned off, the data will not be lost. Furthermore, the database 153 may be structured as one or more databases that may physically be co-located or placed at remote locations and communicating with one another. For example, the database 153 may store:

- measurement results—such as the raw output information of the sensor 121 in connection with measurements made on a certain work-piece. An example of the raw output information of the sensor 121 would be the voltage measured by the passivation measurement device;
- the passivation measurement—as determined or computed by the passivation measurement processing entity 100 on the basis of the raw sensor output and associated with the work-piece. The passivation measurement may also include auxiliary information such as the time and date of the passivation measurement, the passivation measurement device used, the operator of the device, the location on the workpiece at which the passivation measurement was taken, etc.;
- workpiece profiles—associated with a work-piece that may tested with the measurement device 120. A workpiece profile includes information about the work-piece that is being measured. Examples of information include an image of the work-piece that can be displayed to a user. The image may be a static image, which shows the work-piece from one side, or multiple images showing the work-piece from different sides. The image information may be designed such that the image of the work-piece can be manipulated by any suitable image management software, allowing the user to rotate the image, increase the size of the work piece or reduce its size on the display. The image information can be designed to convey the location (e.g., the test point) on the work piece where passivation measurements are to be made, for example through the use of digitals "pins" placed by the user on the image and stored in the software database. Another example is to highlight the location of the welds to show the technician where the measurements are to be taken. A weld can be shown as a highlighted line at the juncture between two components secured to each other. Yet another example is to indicate discrete passivation measurement locations. For instance a continuous weld bead may need to be tested at every inch for sufficient passivation. In such case, the weld bead will show a mark or any other suitable reference at the location where each measurement in the series of measurements is to be made. The workpiece profiles may also include measurement sequencing information, conveying the order in which passivation measurements on the work piece are to be made. The sequencing information is such that it provides detailed guidance to the technician on how to perform the passivation measurements on a particular work piece. The guidance can be in the form of a wizard showing the order in which the measurements are to be taken such as to optimize the passivation measurement process. This would allow inexperienced individuals to perform the passivation measurement procedure correctly and efficiently simply by following the directives on the display. In a more specific example, the wizard starts by displaying the side of the work piece on which the passivation measurements begin, highlighting the precise location where the technician needs to make the first measurement. When the passivation measurement is received for that location it is validated and the wizard displays the results of the validation step. If the measurement is deemed valid, the wizard sequences to the next location, highlighting the next location at which another measurement needs to be made. On the other hand, if the measurement is not valid, a message is shown or a sound is played indicating to the operator that the measurement must be taken again. This process continues until a measurement that is valid has been taken at all locations.
- Sensor calibration information—The sensor calibration information is data that conditions the raw measurement made to the operational context, which can change from time to time. For example, the sensor calibration information allows obtaining the correct passivation measurement for work pieces that may be made of different materials where the raw data gathered by the sensor may actually mean one different degree of passivation for one material but a different one for another material. Thus, the sensor calibration information allows adapting the sensor for the individual work piece on the basis of the work piece properties. The sensor calibration information can also be used to change the sensor calibration when the work piece that is being processed is made of parts of different materials, for instance different stainless steel alloys.
- Customer, contact and project information—customer information includes information such as a customer's name, location and contact information. Each customer may be associated with one or more contacts (e.g., individuals or employees of the customer's company). Each customer and/or contact would then be associated with at least one project. Each project would contain information regarding the component to be measure, test points or pins and the measurement results, after measurements take place (e.g., a workpiece profile).

The machine-readable storage 152, which can physically be part of the database 153, in the sense that both share the same data storage medium, can take various forms and it is designed to store program code for execution by the CPU 151. Typically, the machine-readable storage 152 is designed to retain data in a permanent fashion such that when power is turned off, the data will not be lost. For instance, the machine-readable storage 152 may be used to store executable program code that: interacts with the passivation measurement processing entity 100; interacts with the viewing computing entity 170; runs web-server software and/or runs passivation management software.

Figure 5:
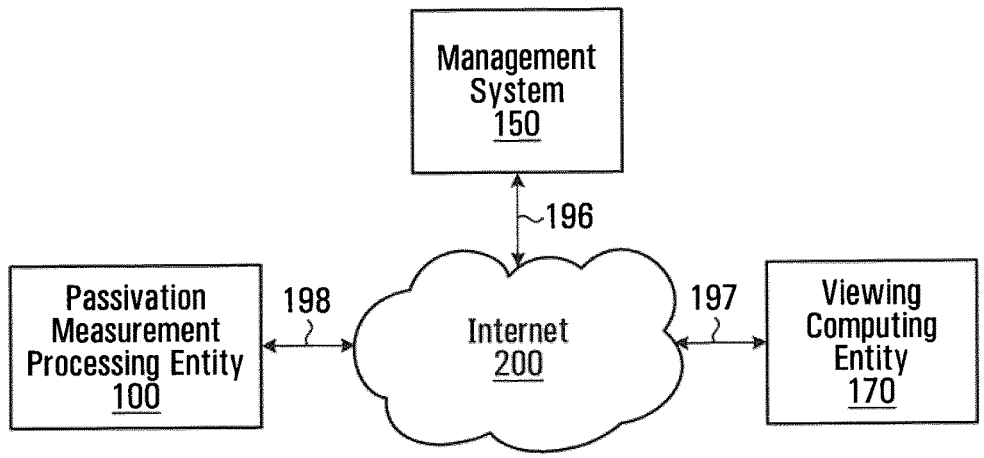
FIG. 5 is a block diagram of a passivation management system, a passivation measurement computing entity, and a viewing computing entity connected to each other over the Internet.

The network interface 154 can take various forms and it is used to connect to the data network connection 190 and data network connection 195 to communicate with the passivation measurement processing entity 100 and viewing computing entity 170, respectively. In a specific and non-limiting example, the data network connection 195 is the Internet and the network interface 154 connects to a router, hub or modem (not depicted) in order to access the Internet. By way of example, as depicted in FIG. 5, the management system 150, the passivation measurement processing entity 100, and viewing computing entity 170 in this specific embodiment are connected to the Internet 200 over the Internet connections 196, 198, and 197, respectively.

The Viewing Computing Entity

Figure 6:
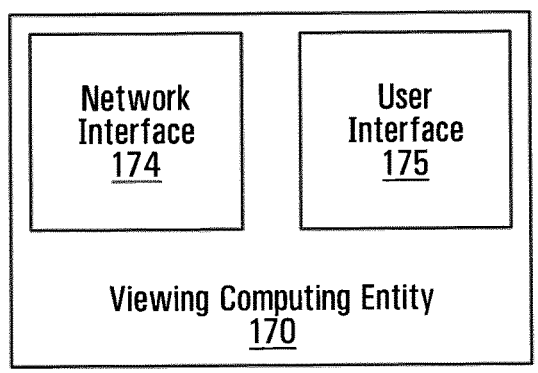
FIG. 6 is a block diagram of a viewing computing entity.

FIG. 6 is a block diagram of an example viewing computing entity. In this embodiment, the viewing computing entity 170 comprises a network interface 174 and a user interface 175. The network interface 174 and the user interface 175 can take various forms and may function in a similar manner as the network interface 104 and user interface 105, respectively.

More specifically, the network interface 174 can take various forms and is used to connect to the data network connection 195 to communicate with the management system 150. In a specific and non-limiting example, the data network connection 195 is the Internet and the network interface 174 connects to a router, hub or modem (not depicted) in order to access the Internet.

The user interface 175 can take various forms and in some embodiment it is a graphical user interface (GUI). In this case, the GUI includes means to deliver visually information to the user, such as a display or a monitor. The GUI may also include graphical tools allowing the user to make selections and input commands, such as a touch screen. The user interface 175 may also include an input means such as buttons, a keyboard and/or mouse allowing the user to make selections and input commands.

For example, a user at the viewing computing entity 170 may interact with the user interface 175 to review and/or interact with the passivation measurements stored on the management system 150.

By way of a non-limiting example, the viewing computing entity 170 may be a cell phone or tablet which downloads an application from a server (e.g., an application store). The downloaded application is installed on to the cell phone or tablet (i.e., the viewing computing entity 170). Such application would allow a user to interact with the management system 150. For instance, the application may communicate via Wi-Fi™ (or a cellular network protocol, if Wi-Fi™ is not available) to access the Internet in order to communicate with the management system 150.

Variants

The measurement and management system 10 may be configured differently in other embodiments.

Figure 7:
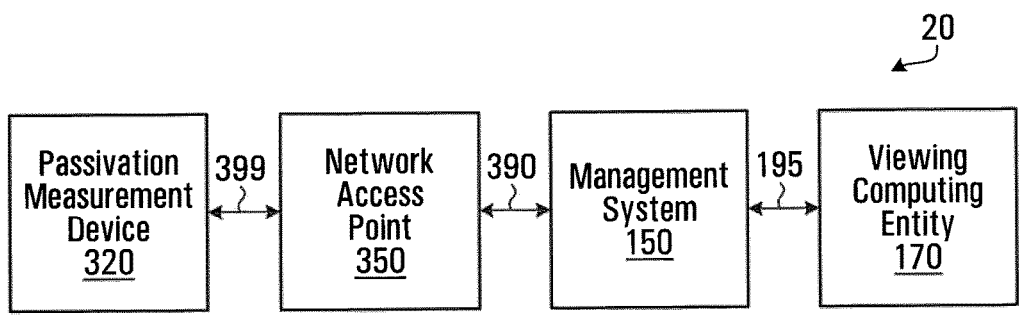
FIG. 7 is a block diagram of an alternative embodiment of passivation measurement and management system.

For example, FIG. 7 is a block diagram of an alternative embodiment of passivation measurement and management system 20. In this particular embodiment, the passivation measurement device 320 connects to a network access point 350 over a wireless connection 399, where the network access point 350 connects to the management system 150 over a data network connection 390.

The passivation measurement device 320 may be a portable electronic device, which may be used to take passivation measurements of work-pieces to determine if the work-piece is sufficiently passivated and/or to determine the amount of passivation at one or more locations of the work-piece. The passivation measurement device 320 differs from the passivation measurement device 120 in that the passivation measurement device 320 does not connect or communicate with the passivation measurement processing entity 100.

Figure 8:
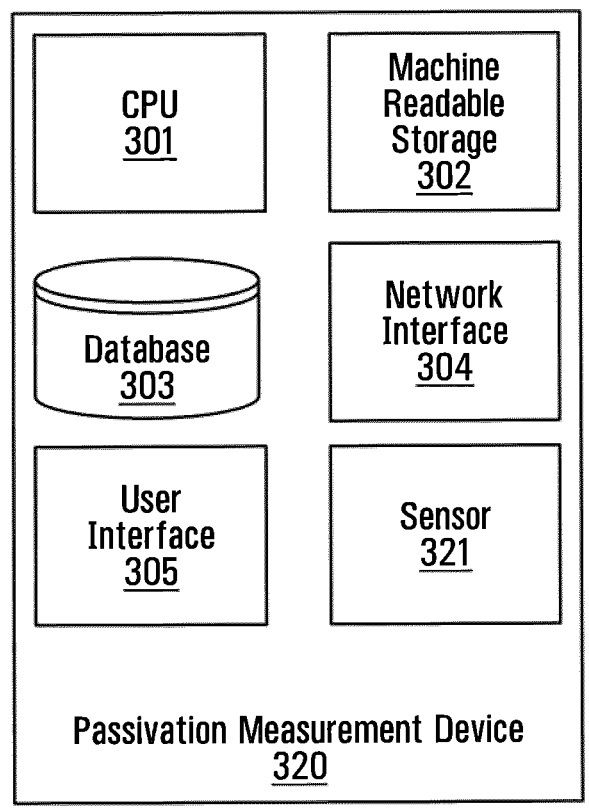
FIG. 8 is a block diagram of an alternative passivation measurement device.

FIG. 8 is a block diagram of the passivation measurement device 320. In this case, the passivation measurement device 320 comprises a CPU 301, a machine-readable storage 302, a database 303, a network interface 304, a user interface 305 and sensor 321. In this embodiment, the CPU 301, machine readable storage 302, the database 303, the network interface 304, the user interface 305 and the sensor 321 may communicate with one another over one or more data buses, not shown in the drawing for clarity.

The CPU 301, machine readable storage 302, the database 303, the network interface 304, the user interface 305 and the sensor 321 can take various forms and may function in a similar manner as the CPU 101, machine readable storage 102, the database 103, the network interface 104, the user interface 105 and the sensor 121, respectively.

More specifically, the measurement device 320 connects to the network access point 350 over the wireless connection 399 and the network access point connects to the management system 150 over the data network connection 390. In a specific and non-limiting example, the data network connection 390 may be the Internet and the wireless connection 399 may be Wi-Fi and the network access point 350 may be Wi-Fi™ router, hub and/or a modem, which connects to the Internet. In alternative embodiments, the network access point 350 may be an access point to a cellular network (e.g., 3G, 4G, LTE™, 3GPP™, EDGE™, WiMax™, etc.).

In this embodiment, the passivation measurements or data may be transmitted to the management system 150 without first transmitting the passivation measurements or data to a passivation measurement processing entity 100 as the functionality of the passivation measurement processing entity 100 is integrated in the passivation measurement device 320.

By way of another example, the passivation measurement device 120 may not connect with the passivation measurement processing entity 100. As such, the measurement data from the passivation measurement device 120 is displayed on the passivation measurement device 120 and is manually entered into the passivation measurement processing entity 100 through the user interface 105. In this mode, the passivation measurement device 120 can be used without recording the results. This is a quick mode of operation where an operator may want to get a passivation measurement that is not part of any testing or quality control protocol. The quick mode of operation does not require the passivation measurement device 120 to communicate with another entity, hence it is easy to set up and use. The passivation measurements are thus shown to the operator but they are not kept in memory.

Alternatively, the results are kept in memory and can be uploaded to the passivation measurement processing entity 100 when the connection 199 is established. For instance, the operator making the passivation measurements may be physically too far from the passivation measurement processing entity 100 for the connection 199 to be enabled. In those circumstances, the operator will make the measurements, store them in memory and once closer to the passivation measurement processing entity 100, the connection 199 is established and the data is transferred.

Alternatively, in some embodiments, the data network connection 190 is a wide area network (WAN) connection, local area network (LAN) connection, or any other wired or wireless connection. In other words, in alternative embodiments, the management system 150 and the passivation measurement processing entity 100 may be part of the same LAN, WAN or other network.

Likewise, in some alternative embodiments, the data network connection 195 is a wide area network (WAN) connection, local area network (LAN) connection, or any other wired or wireless connection. In other words, in alternative embodiments, the management system 150 and the viewing computing entity 170 may be part of the same LAN, WAN or other network.

Furthermore, in the embodiments shown above only a single passivation measurement processing entity 100, passivation measurement device 120 or 320, and viewing computing entity 170 is discussed. However, it is to be understood that there may be numerous measurement devices 120 connected to one or more measurement computing entities 100, where the one or more measurement computing entities 100 may be located at different locations. Similarly, there may be numerous measurement devices 320 connected to numerous network access points 350. Furthermore, there may be one or more viewing computing entities 170, where the one or more viewing computing entities 170 may be located at different locations.

Functionality of the Passivation Measurement and Management System

Some of the functionalities of passivation measurement and management system 10 and 20 will now be discussed by way of several examples:

Process of Testing of a Welded Metal Product

Figure 9:
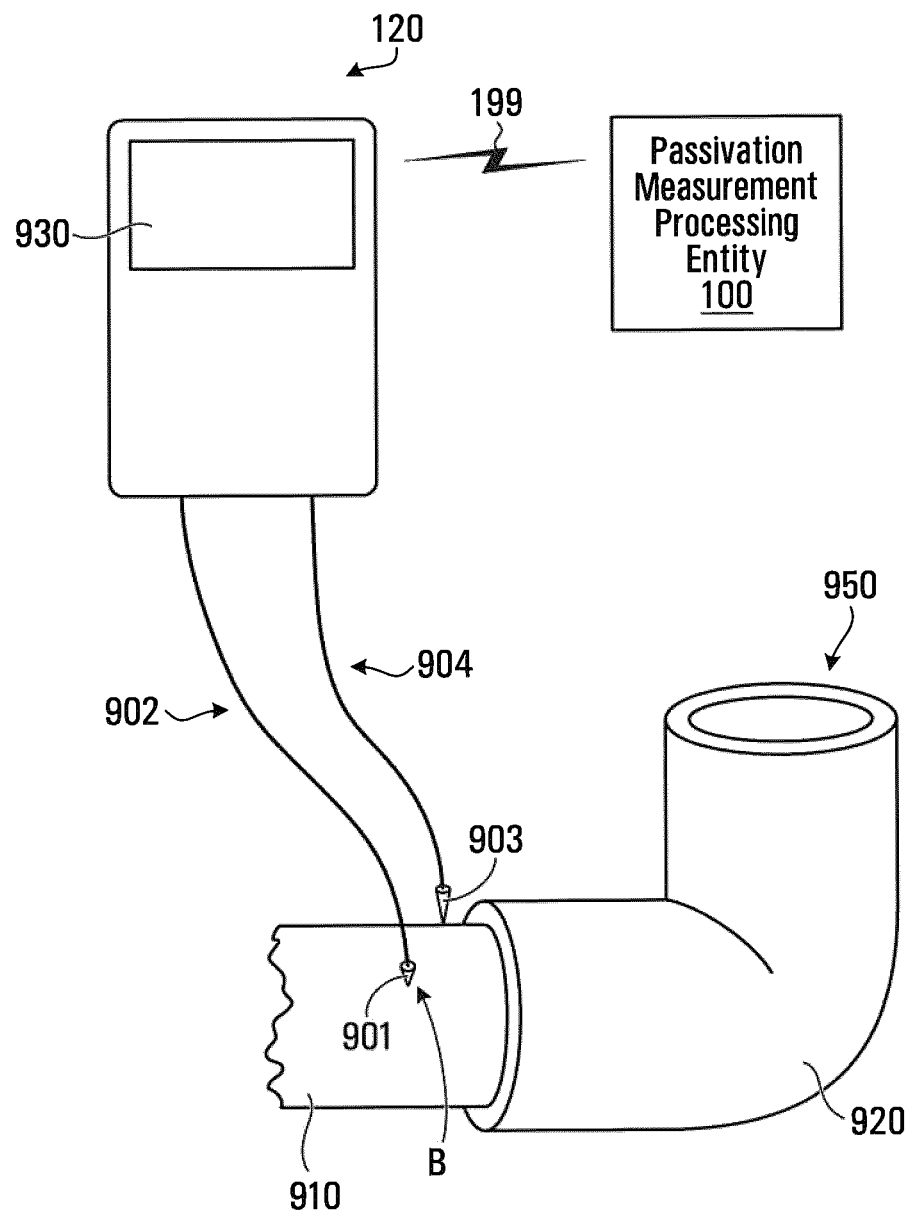
FIG. 9 illustrates an example of a passivation measurement device taking a passivation measurement.
Figure 11:
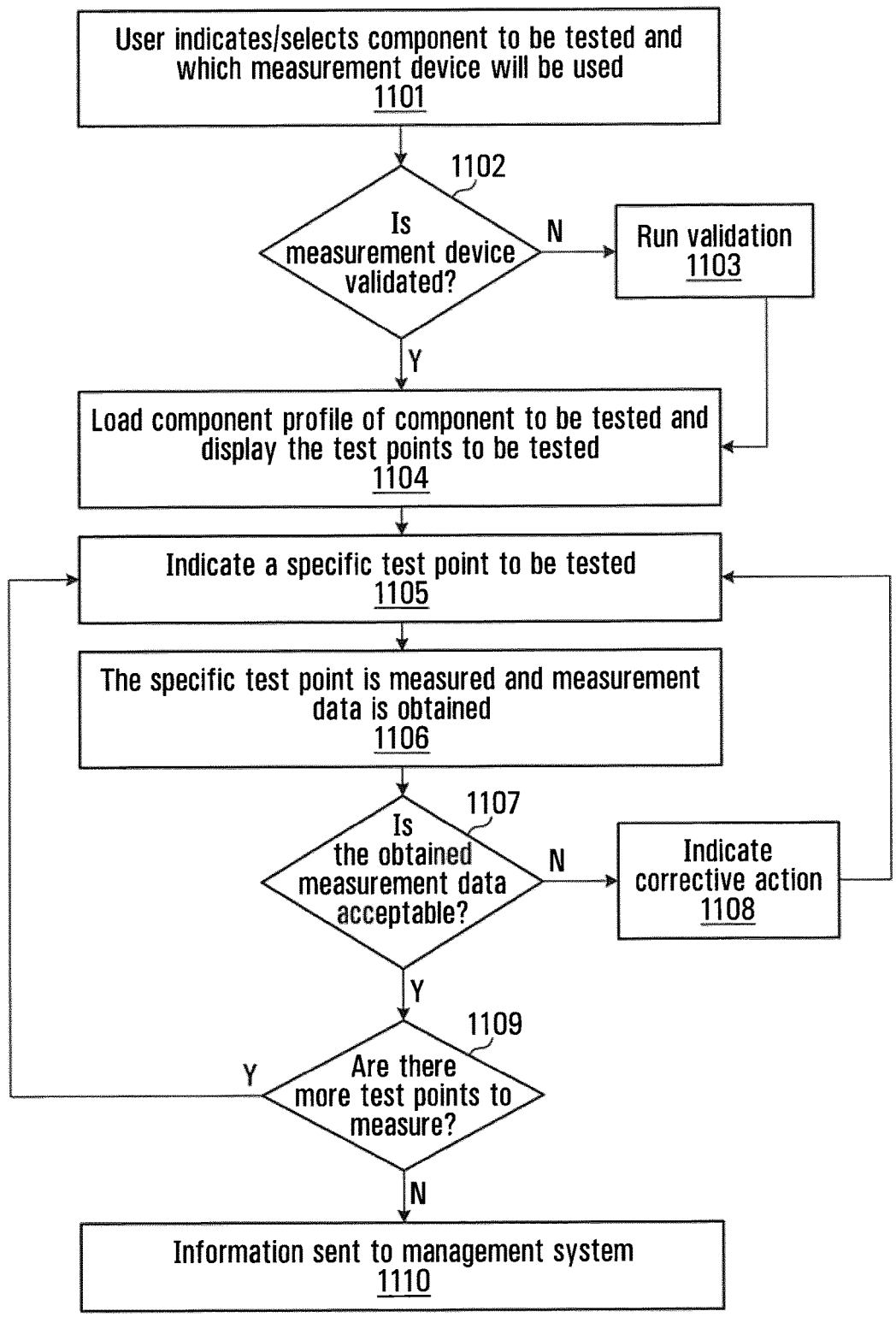
FIG. 11 is a flowchart showing the steps performed during a passivation measurement.

FIG. 9 illustrates an example of a passivation measurement device taking a passivation measurement. In this particular example, a user wanting to test a welded metal product 950 interacts with the passivation measurement processing entity 100 and the passivation measurement device 120 in the process of taking a passivation measurement. More specifically, FIG. 11 shows the steps of a method and/or process of testing the welded metal product 950.

At step 1101 a user specifies the work-piece to be tested. Generally, the information can be input in three different ways. The first way is to enter directly the parameters of the work piece into the passivation measurement processing entity 100. For example, a user may indicate through the user interface 105 of the passivation measurement processing entity 100 that a steel tubing 910 welded into an L-joint connector 920 is to be tested. The user may also enter in other parameters, such as information relating to the characteristics or the weld, the type or grade of stainless steel used (e.g. 306, 321, etc.), the type of filler rod used, the type of welding torch used. The user may also enter in other parameters, such as information relating to the passivation method used to restore the passivation at the weld, the original passivation technique, or measurements or data corresponding to the passivation at various points prior to welding. Furthermore, the user may also enter other parameters, such as information relating to the settings of the passivation measurement device 120 (e.g., sensitivity, range of voltage, resistance range values, etc.).

The second way information can be input into the passivation measurement processing entity 100 through the user interface 105 is to enter an identifier of the work piece, which allows the passivation measurement processing entity 100 to send a request to the management system 150. In response to this request, the management system searches an internal database for the parameters of the work piece on the basis of the identifier provided and sends back the relevant workpiece profiles and sensor calibration information to the passivation measurement processing entity 100.

The third way information can be input into the passivation measurement processing entity 100 through the user interface 105 is by a user creating a new project which may include entering in customer information (e.g., a customer name, a customer number, and/or a contact name for that customer) or selecting an existing customer, if such the customer's information has already been added to the management system 150. Then the user can enter in a description of the work-piece, the stainless steel grade, and add one or more pictures, which may include taking photos of the work-piece with the camera of the passivation measurement processing entity 100. Then the user can add pins (e.g., by dragging and dropping) onto the picture of the work-piece, which indicate the measurement or test point locations.

In addition, the user that is to perform the passivation measurements can specify to the passivation measurement processing entity 100 the specific passivation measurement device 120 that is to be used. Specifically, the user can input the model number of the passivation measurement device 120 such as to allow the passivation measurement processing entity to properly interpret the output of the passivation measurement device 120. For instance, the passivation measurement processing entity 100 may use different configuration files for different passivation measurement device models. By being aware of the specific passivation measurement device 120 model that is being used, the passivation measurement processing entity 100 can load the proper configuration file that correctly maps the output of the passivation measurement device 120 to passivation values or degrees.

Furthermore, at this step, the passivation measurement processing entity 100 and the passivation measurement device 120 may communicate with each other. For instance, the passivation measurement processing entity 100 may send a request to the passivation measurement device 120 to see if it is available to take measurements, and/or the passivation measurement device 120 may send a notification or acknowledgment to the passivation measurement processing entity 100 that it is ready to take measurements.

At step 1102 the passivation measurement processing entity 100 performs a validation of the passivation measurement device 120 to ensure the device is fully operational and ready for use. For example, the validation process includes checking the status of the battery used to power the passivation measurement device 120 and request that the operator specifically verifies a number of additional parameters of the passivation measurement device 120.

The additional parameters to be verified will vary depending on the specific type of passivation measurement device 120. For instance, when the passivation measurement device 120 uses a sensing tip made of felt material that needs to be wetted in electrolytic solution, the validation process will include displaying a message on the passivation measurement processing entity 100 asking the operator to confirm that the tip is wet and also that the tip is clean (a soiled tip may not provide accurate results).

After the operator confirms that the tip is wet and it is clean, an additional message is displayed asking the operator to put the passivation measurement device 120 in contact with a negative reference plate, which is made of material such as to show a negative reading. If the operator confirms that a negative reading is showing, then a final message appears asking the operator to put the passivation measurement device in contact with a positive reference plate made of material that will show a positive reading. If the operator confirms that the reading is positive, then the passivation measurement processing entity 100 considers the passivation measurement device 120 as being validated and enables further measurements.

Note that the validation details can be stored and made part of the record to establish that measurements have been made with a validated passivation measurement device 120. The validation details can include the answers to the questions presented to the operator and also the readings obtained with the positive and negative reference plates.

Once a validation is performed, a timer is triggered at the passivation measurement processing entity 100 such as to re-run the validation periodically. That time period can vary and it can be in the range of a couple of hours to a couple of days, the point being to force the operator to run a validation procedure repeatedly such that the measurements made are accurate. When the current validation has expired, in other words the timer is expired, which is indicated by the negative at the decision step 1102, the passivation measurement processing entity 100 will re-run the validation procedure again at 1103 in other to enable further passivation measurements to be taken.

After the validation procedure a workpiece profile is loaded at step 1104. The workpiece profile can be entered manually by the user or obtained from the management system 150 on the basis of the work piece identifier supplied by the user. As discussed earlier, the workpiece profile includes information such as, a work-piece identifier, an image representation of the work-piece and a listing of the locations of the test points (e.g. pins) on the work-piece that may be part of a wizard for performing the passivation measurement. All or part of the workpiece profile information may then be displayed on the GUI of the user interface 105. Furthermore, at this step the test points to be tested are also displayed to the user.

Figure 10:
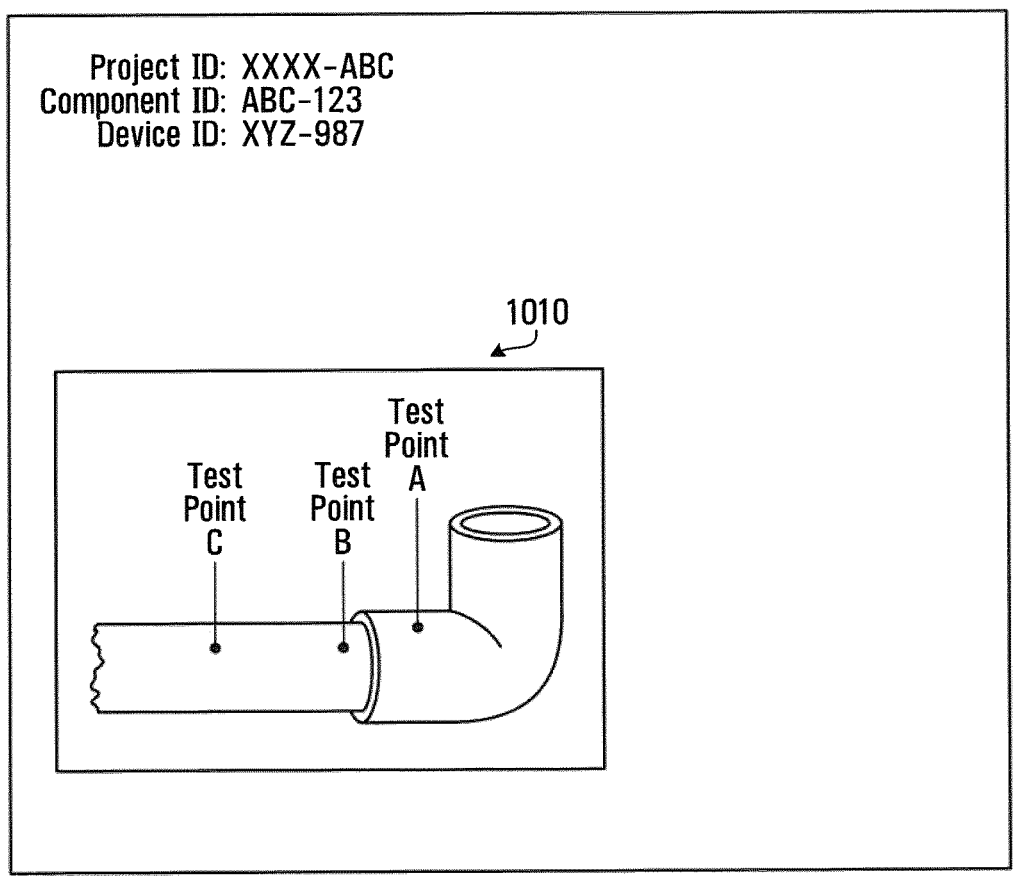
FIG. 10 shows an example screen shot of the user interface of a measurement computing entity.

For instance, FIG. 10 shows an example of a screen shot, which may be visible on the GUI of the user interface 105 of the passivation measurement processing entity 100. More specifically, the passivation testing software may cause to be displayed on the GUI of the user interface 105 the component 950 of the workpiece profile 1010 depicting the welded metal product 950 to be tested. In this example, the workpiece 950 associated with the workpiece profile 1010 is shown as a stainless steel tubing 910 connect by a L-joint connector 920 and illustrates three test points (Test Point A, Test Point B and Test Point C) which are to be tested.

At step 1105 a specific test point is indicated to the user that it should be tested. Alternatively, the user may select the test point that he/she would like to test next. Then at step 1106 the specific test point is measured with the passivation measurement device 120. The output of the sensor on the passivation measurement device 120 is then transmitted to the passivation measurement processing entity 100, where it is processed against the calibration file to extract the corresponding passivation result or degree.

FIG. 9 illustrates an example of the passivation measurement device 120 where two probes 902, 904 are used to test steel tubing 910 around the point where it was welded into an L-joint connector 920. A user of the passivation measurement device 120 places the two probe tips 901, 903 at a test point B and presses a button to take the measurement. The measurement value may then be shown on the display 930 or may show whether the measurement is over a certain threshold. The display 930 may be a LCD display that digitally shows the passivation measurement. Additionally, the passivation device 120 may have a LED (not illustrated in FIG. 9), which indicates when a measurement has been taken. The measurement may be taken over a measurement interval to make sure the readings have stabilized and are consistent. That is, several measurements may be taken over, for example, a 10 second measurement interval and an average is taken of the measurements once stabilization has occurred, which may occur a couple of seconds into the measurement interval.

Then at step 1107, the measurement value or data corresponding to the passivation level at the test point is received or obtained at the passivation measurement processing entity 100 and is compared to the value for that specific test point or for the component being tested in general. The comparison may be made to determine if the level of passivation measured is over a certain threshold. For instance, for each test point received or obtained the measurement value or data may then be stored in a test results data file if the value received is over the threshold value. However, if the level of passivation is under a certain threshold then a corrective action may be indicated to the user and the component may be marked as unsatisfactory in the test results data file until a corrective action is taken to correct the deficiency.

Note that before recommending a corrective action to the user, the system runs logic that can detect instances where the measurements made may not be correct. A typical scenario is one where the passivation measurements are made immediately of very soon after the metal is cleaned and not enough time has been left for the passivation layer to grow. In such instances, a message is displayed on the passivation measurement processing entity 100 indicating to the operator to wait a predetermined time period and to retest the workpiece.

The software implementing the logic runs into the passivation measurement processing entity 100 and monitors passivation measurements. If a number of measurements received are all consistently negative, the logic triggers the message since there is a good possibility that the workpiece is too fresh to be properly tested.

At step 1108, if it was determined in step 1107 that the level of passivation measured is unacceptable then an indication of a corrective action is presented to the user. Furthermore, the corrective action presented to the user may depend on the level of the passivation measured. For instance, if the level of passivation is slightly below the desired results the recommend course of action may be one course of action but if the value is significantly below the desired result a different recommended course of action may be provided to the user. For example, the different course of action may be chemical treatment, grinding, sandblasting, etc. As the oxide layer can grow with time, one corrective action can be to wait a specific time period (e.g., 24 to 48 hours) and then redoing the passivation measurement to see if the oxide layer has grown to an acceptable level.

Next, if there are more test points to be measured this is determined at step 1109. For instance, after the each point is measured if it is determined that there is another test point that has not yet been tested then steps 1105 to 1109 are repeated. This process continues to be repeated until there are no longer any more test points to be measured. It will be appreciated that the process of taking measurements at the test points may be repeated over a time interval (e.g., every 24 to 48 hours) to see if the oxide layer is growing with time after passivation of the weld has been done. For example, after the completion of the passivation operation a passivation measurement may be done, then every 24 hours for the next 3 days passivation measurements may be done to measure the change in passivation with time.

At step 1110, the information relating to the passivation measurements is sent to the management system 150 from the passivation measurement processing entity 100. For instance, as noted above, the measurement value or data corresponding to the passivation level at each of the test point for the work-piece of the workpiece profile may be saved to a test results data file, and at this step the test results data file may be sent to the management system 150. More specifically, the test results data file may include some or all of the information from the workpiece profile (e.g., component id, test points, values required at each test point, etc). Furthermore, the test results data file may include the values measured for each test point, the measurement device used (e.g., the measurement device identifier), calibration data regarding the measurement device, batch identifier, date and time of measurements, etc.

In alternative embodiments, a measurement device 320 may take readings similarly to the passivation measurement device 120 but the measurement value or data corresponding to the test point may be communicated to the management system 150 via a network access point 350. In these alternative embodiments, a measurement device 320 may display on its display the workpiece profile 1010 and the user may interact with the measurement device 320 instead of the passivation measurement processing entity 100 as some or all of the functionality of the measurement computing entity may be present on the measurement device 320. In these alternative embodiments, the functionality of measurement device 320 is similar to the functionality of passivation measurement device 120 and passivation measurement processing entity 100 discussed above in relation to FIG. 11, but in a combined fashion.

It will be appreciated that the steps of the method illustrated in FIG. 11, may take place in different orders. For instance, the process regarding the selecting of the component to be tested at step 1101 may take place at step 1104. In other words, the validation operation may take place prior to indicating which work-pieces are to be tested. Alternatively, the loading of the workpiece profile and displaying/selecting of the test points of step 1104 may take place prior to performing the validation. Furthermore, step 1110 may take place at different steps of the process. For example, information may be sent to the management system 150 after the measurement data is obtained at step 1106. Alternatively, information may be sent to the management system 150 after each step or after each measurement.

Figure 12:
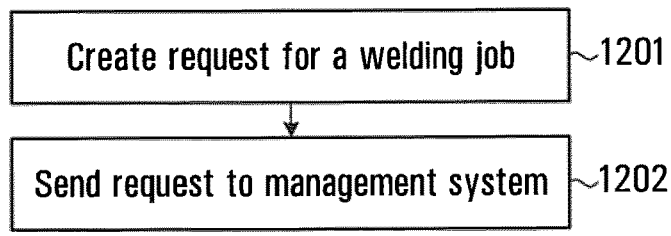
FIG. 12 is a flowchart showing the steps that are performed by the viewing computing entity when a user creates a request for a welding job.

Process of Creating a Request for a Job and/or Create Component Files at the Viewing Computing Entity FIG. 12 is a flowchart showing the steps that are performed at the viewing computing entity 170 when a user at the viewing computing entity 170 creates a request for a welding or manufacture job. At step 1201, a user at the viewing computing entity 170 creates a job request. This request involves one or more workpiece profiles associated with a work-piece. A workpiece profile includes information such as, lists of individual elements or components to be assembled into a work-piece, one or more work piece identifiers, an image representation of the work piece(s), listing of the locations of the test points on the work pieces(s), and the minimum values of passivation required at each of the test points. Then, at step 1202, the request is communicated or sent to the management system 150.

Alternatively to a user of the viewing computing entity 170 creating a request for a welding job through the viewing computing entity 170, a welder may receive a request for a welding job outside of the system. In this case, the welder would create the workpiece profile detailing the work-piece and test points (as discussed elsewhere) via the passivation measurement processing entity 100.

When a cell phone or a tablet is used to run the software implementing the passivation measurement processing entity 100, the supporting hardware has all the necessary components to allow the welder to create the workpiece profile. In particular, the camera on the cell phone or tablet can be used to take a picture of the workpiece on which markers can be placed to indicate the locations at which a passivation measurement has been taken. Once the workpiece profile is created at the passivation measurement processing entity, that workpiece profile is transmitted to the management system 150 for storage.

In other alternative embodiments, the management system has a set of pre-defined or user submitted workpiece profiles and the user at the viewing computing entity selects one or more workpiece profiles for a job that it wants done. In other words, the user may select workpiece profiles stored on the management system for the requested job to be completed. This is particularly useful when the workpiece being made is identical to workpieces made previously, allowing workpiece profiles to be used. In this scenario, the management system 150 stores a library of workpiece profiles that can be accessed by the user. For example, the Graphical User Interface at the passivation management processing entity 100 has an input object listing the workpiece profiles in the library. The user can select in the list the workpiece profile corresponding to the workpiece being made. The selection mechanism displays images of the workpieces associated with the workpiece profiles for easier reference.

Process of the Management of the Measurement Data

After the user at the viewing computing entity 170 sends a request for a welding job to be done to the management system 150, the management system 150 performs a number of steps.

Figure 13:
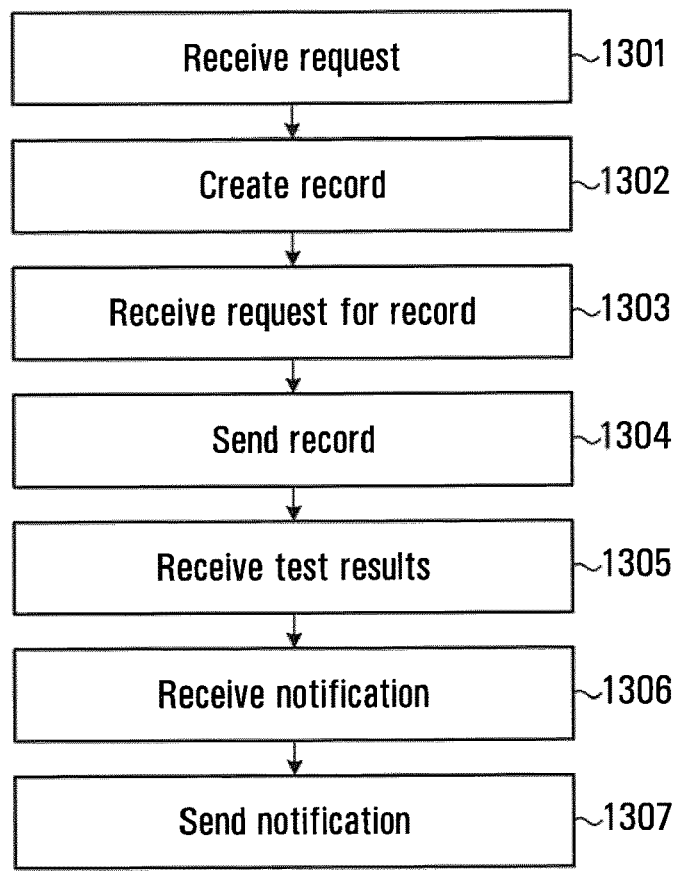
FIG. 13 is a flowchart showing the steps of the process performed by the management system.

FIG. 13 shows a flowchart of the steps performed by the management system 150 after the user at viewing computing entity 170 sends a request for a job to be done.

At step 1301 the management system 150 receives a request from a viewing computing entity 170 for a welding job to be done. This request includes information on one or more workpiece profiles associated with different work-pieces, as discussed above in the section entitled "Process of creating a request for a job and/or create component files at the viewing computing entity". In response to this request, at step 1302, the management system 150 creates a data record or work file containing the information in the request from the viewing computing entity 170. For example, this file may include information on one or more workpiece profiles associated with different work-pieces. Furthermore, the created data record or work file may be stored in the database 153.

In some embodiments, the request received at step 1301 may include information pertaining to a specific welder or welder company that the user at the viewing computing entity has requested to complete the welding job. In these embodiments, the management system 150 may then send a notification to a welder or welding company that a welding job exists. More specifically, this notification is used to inform a user that a work file stored on the management system 150 is available to be accessed by a user of the passivation measurement processing entity 100. In some embodiments, the notification may be an email, while in other embodiments the notification may be an electronic message sent to software running on the passivation measurement processing entity 100. Note that the step of sending a notification is omitted from the flowchart of FIG. 13, as it pertains to specific embodiments of the invention.

Regardless of whether or not a notification is sent, a user at the passivation measurement processing entity 100 may then connect and login to management system 150 to view, obtain or request the work file or data record. It is appreciated that prior to a user specifying a work-piece to be tested (for example, as done in step 1101 of FIG. 11), the user may make a request to the management system 150 and obtain the work file relating to the word-piece to be tested. As illustrated in FIG. 13, at step 1303, the request is then received at the management system 150. At this step, login information may be exchanged to determine if the user at the passivation measurement processing entity 100 is authorized to have access to the requested data record or work file. At step 1304, the requested data record or work file is sent to the passivation measurement processing entity 100.

At this stage of the flowchart of FIG. 13, a user at the passivation measurement processing entity 100 has information regarding the welding job to be done and the welder can then proceed to complete the welding job. For example, the information regarding the welding job may include a work-piece 950 to be welded by welding a steel tube 910 and L-joint connector 920 together. In this example, after the steel tube and L-joint connector are welded together, the welder may then test the passivation of the work-piece 950, according to steps setout in FIG. 11. Once a user at the passivation measurement processing entity 100 and/or passivation measurement device 120 is done taking passivation measurements of a welded work-piece the measurement data or information is sent to the management system 150 (at step 1110 of FIG. 11).

At step 1305, the management system 150 receives test or measurement results from the passivation measurement processing entity 100. For example, the received test or measurement results may include: measurement results, the passivation measurement, workpiece profiles, and/or sensor validation information, as discussed above in the section entitled "The passivation measurement processing entity". In some embodiments, received test or measurement results may be sent in the form of a data record or work file. Alternatively, the received test or measurement results may be an updated version of the data record or work file, which was previously sent to the passivation measurement processing entity 100. The management system 150 may then update the data record or work file according to the received test or measurement results. Next, in specific embodiments of the invention, the management system 150 notifies the viewing computing entity 170 of the updated work file. Alternatively, the management system 150 sends the work file to the viewing computing entity 170.

Then, for example, the user at the viewing computing entity 170 can review the updated data record or work file and then send a notification to the management system 150 that it either accepts or rejects the measurement results (see step 1402 of FIG. 14, discussed later on). In other words, this notification may be an acceptance or rejection of the level of passivation of the work piece requested in the welding job. In the case of a rejection notification, the user at the viewing computing entity 170 may specify further steps or instructions required by the welder/user at the passivation measurement processing entity 100. For example, the additional steps or instructions could be to re-passivate the work piece or that a certain level of passivation is required at specific points of the work piece.

At step 1306, the notification from the viewing computing entity 170 is received which may indicate that the user at the viewing computing entity 170 accepts or rejects the measurement or test results in the work file. Then as step 1307, the management system 150 notifies the user at the passivation measurement processing entity 100 of the acceptance or rejection of the measurement results. It is appreciated that once the user at the passivation measurement processing entity 100 is notified of an acceptance of passivation measurements that the user can then deliver or ship the completed work pieces to party that requested the welding job.

In alternative embodiments, the user at the viewing computing entity 170 may not make a request to the management system 100 (i.e., steps 1301 to 1304 are not done). In this case, the user at the passivation measurement processing entity 100 obtains workpiece profiles stored on the management system based on pre-defined workpiece profiles based on industry standards or standards set by another party (such as a user at a viewing computing entity 170). Furthermore, in this case, the user at the passivation measurement processing entity 100 may create a work file specifying the workpiece profiles and the measurement results. Then once this is received at the management system the user at the viewing entity may be notified that such results are available for review.

In other embodiments, the user at the measurement computing entity 170 may make a request for a workpiece profile to be completed instead of a work file to be completed and the steps would be similar to those discuss above in the case where the user at the measurement computing entity 170 make a request for a work file to be completed.

Furthermore, it is to be understood that the discussed functionality of the management system 150 may be part of passivation management software and/or server or webserver software running on the management system 150.

Process of Viewing Passivation Test Results at the Viewing Computing Entity

Figure 14:
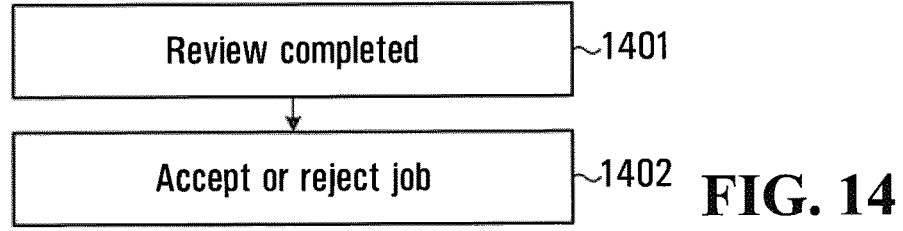
FIG. 14 is a flowchart showing the steps performed by the viewing computing entity when a user reviews a request.

FIG. 14 is a flowchart showing the steps that may be done by a viewing computing entity when a user reviews a requested job. More specifically, at step 1401, a user at the viewing computing entity 170 can access, receive and/or review the test or measurement results that correspond to a requested job, workpiece profiles or work file. In other words, the user may access the records stored in the database on the management system 150 for which it is authorized to do so. For instance, the user may review the records to determine whether a requested job has been completed or not. In the case that a job requested has been completed (i.e., the measurement or test results are available) the user may then review the completed job. At step 1402, the user after viewing the completed job may then decide to either accept or reject the completed job. For instance, if the certain passivation measurements are below a certain threshold or quality, the user may then reject the completed job and specify why.

In alternative embodiments, the user need not accept or reject the job (i.e., step 1402 is not completed).

It will be appreciated that the steps of the methods illustrated in FIGS. 11 to 14, may take place in different orders and certain steps may be omitted.

Example 1

To elaborate on the functionality of the measurement and management system 10 and 20, a simplified, specific and non-limiting example will now be discussed.

Figure 15:
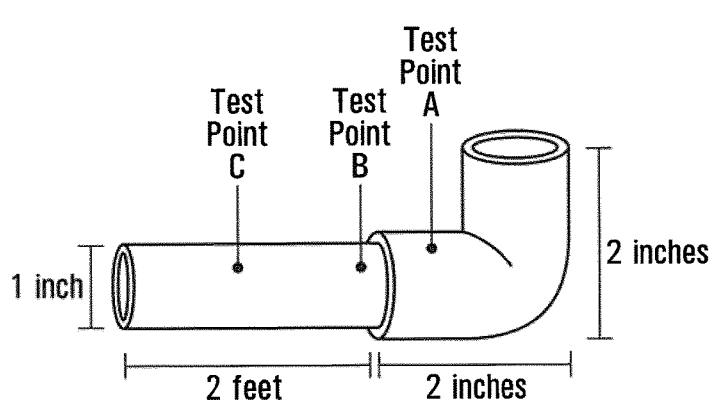
FIG. 15 is an example of a passivation record stored at the management system.

A user at the viewing computing entity 170 creates a request for a welding job. In this example, three stainless steel tubes welded into stainless steel L-joint connectors are to be analyzed. The user specifies the work-piece that are required to be welded, in this case the stainless steel tubes. The user also specifies that the tubes length is 1 foot and the diameter is 1 inch and that the L-joint connector size is 2 inch by 2 inch. The number of work-pieces required to be manufactured which is three is also specified. The user then specifies that its company Manufacture International Inc. request Welding Co. Ltd. (i.e., the welding company) to complete the job. Furthermore, the user specifies the level of passivation required and the specific test points that the welding company is to test after welding the work-pieces. The user specifies three test points A, B, and C (as is illustrated in FIG. 15) and specifies that each test point must be at least +1.0 V (volts) Moreover, the user specifies how the passivation is to be restored. The user then sends the request to the management system 150.

The management system 150 then stores the requested job in its database as a record 1500. The record 1500 is illustrated in FIG. 15. Next, the management system notifies the welding company of the requested welding job (e.g. an email notification). Alternatively, the user that made the request notifies the welding company of the existing job.

A welder at the welding company logs into the passivation measurement processing entity 100 and retrieves the requested welding job. The welder then welds the work-pieces as specified in the job and then restores the passivation in the welded products (which may be according to instructions in the requested job).

After passivation has been restored, the welder then takes passivation measurements for each of the three finished products with the passivation measurement device 120. In this example, the three finished products have product identifiers P1, P2, and P3. The welder then tests the first finished product P1 at test points A, B, and C. The welders passivation measurement device 120 and/or passivation measurement processing entity 100 indicates that at test points A, B, and C the level of passivation is +1.2 V, +1.1 V and +1.3 V all of which are over +1.0 V. In this case, the welder is done testing the finished product P1 and no further action is required.

Then the welder tests the second finished product P2 at test points A, B, and C. The welders passivation measurement device 120 and/or passivation measurement processing entity 100 indicates that at test points A, B, and C the level of passivation is +0.8 V, +1.4 V and +1.5 V. However, for P2 the measurement at test point A is less than +1.0 V. The measurement computing 100 entity then specifies to the welder to either grind or sandblast the work-piece around test point A. Once the welder has grinded or sandblasted the work-piece around test point A the welder re-measures the work-piece with the passivation measurement device 120. In this example, on re-measurement test point A has a passivation of +1.2 V, which is above the threshold of +1.0 V. Now, the welder is done testing the finished product P2 and no further action is required.

Then the welder tests the third finished product P3 at test points A, B, and C. The welders passivation measurement device 120 and/or passivation measurement processing entity 100 indicates that at test points A, B, and C the level of passivation is −0.3 V, +0.1 V and +0.2 V. In this case, for P3, the measurements at test point A, B and C all are less than +1.0V. The measurement computing entity then specifies to the welder to apply chemical treatment. Once the welder has applied chemical treatment, the welder re-measures the work-piece. In this example, on re-measurement the passivation at test points A, B, and C is +1.8 V, +1.5 V and +1.6 V, all of which are above the threshold of +1.0 V. Now, the welder is done testing the finished product P3 and no further action is required.

Figure 16:
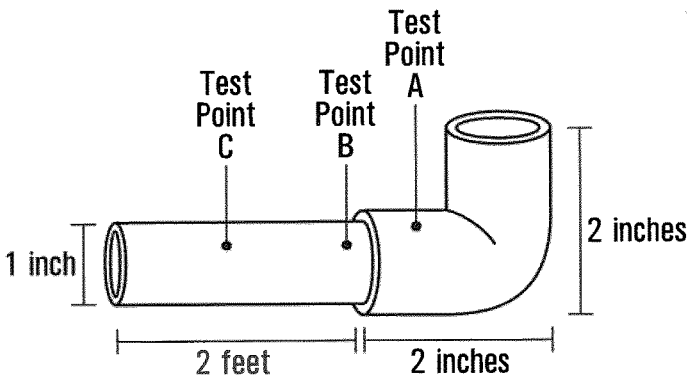
FIG. 16 is an updated version of the record of FIG. 15.

As products P1, P2 and P3 all meet the certain passivation threshold, the welder and/or the passivation measurement processing entity 100 submits the finished job including all of the measurement results and information relating the measurement device to the management computing entity 150. The management computing entity 150 then updates its record 1500. FIG. 16 shows an updated version of the record 1500 after receiving the results and information from passivation measurement processing entity 100. The management computing entity 150 then notifies the user at the viewing computing entity 170 of the passivation measurement and data results. The user then logs into the management system 150 via the viewing computing entity 170 to review the results. If the user is satisfied with passivation measurement and data results the user then specifies to the management system 150 such satisfaction. The management system 150 can then notify the welding company that the products P1, P2 and P3 can be shipped to the user.

Example 2—SURFOX™

To elaborate on the functionality of the measurement and management system 10 and 20, a second simplified, specific and non-limiting example will now be discussed.

In this example, a welder has a passivation measurement device 120 and a tablet, which acts as the passivation measurement processing entity 100. The welder has downloaded an application from an application store, which has been installed on the tablet. The passivation measurement device has a machine identifier, which is registered with the management system prior to taking any passivation measurements. The passivation measurement device also has a Bluetooth™ identifier, which is used by the tablet for communications between the tablet and the passivation measurement device.

The welder receives an order (offline) to weld a stainless steal sink from a company named "Sink Sellers Co.". The order also requires that a passivation test is performed on the sink prior to delivery. The welder proceeds to weld the sink according to the order specification. Then the welder logs into the management system 150 via the application running on his tablet (i.e., the passivation measurement processing entity 100). The login process includes providing an identifier (e.g, a user name or email address) and a password.

Figure 17:
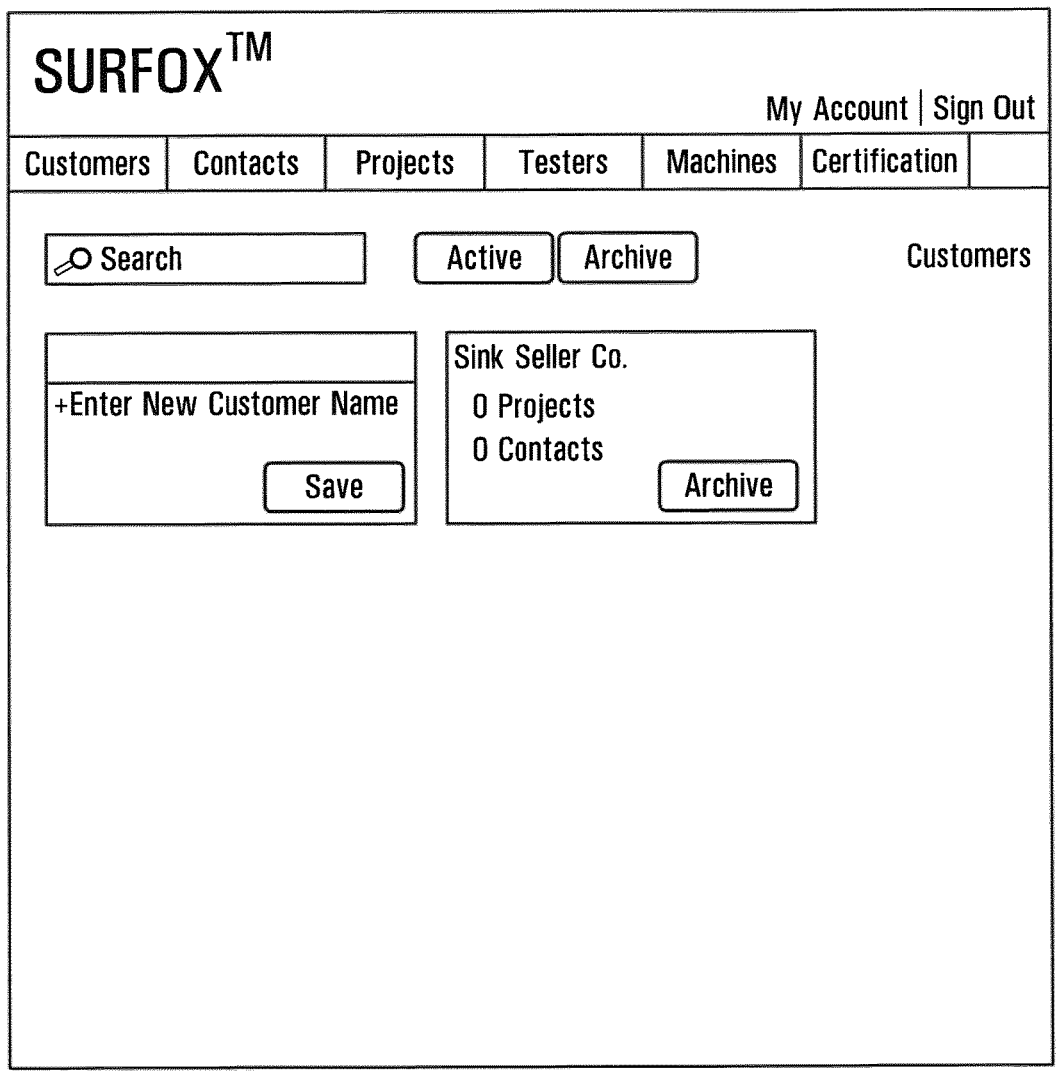
Figure 18:
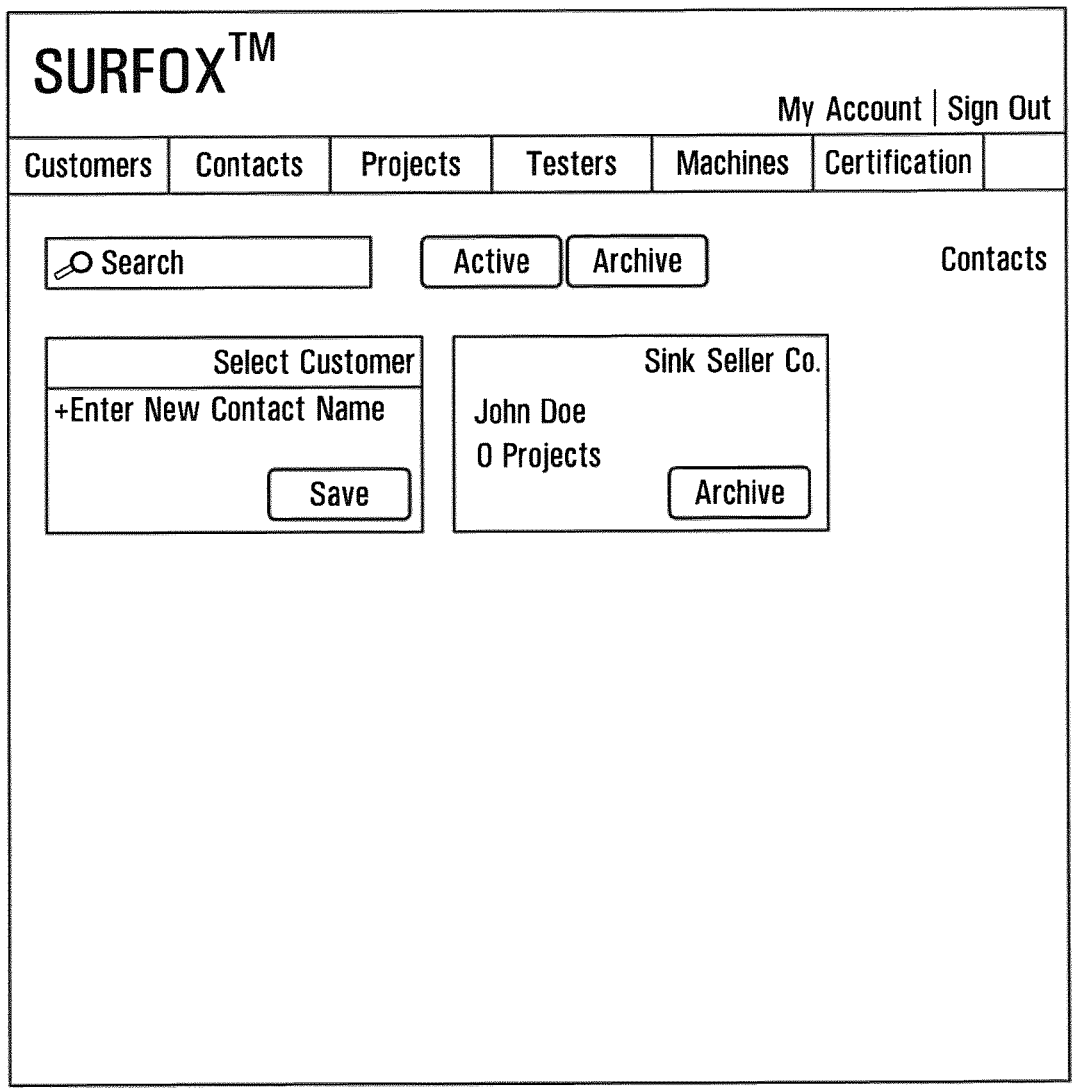
Figure 19:
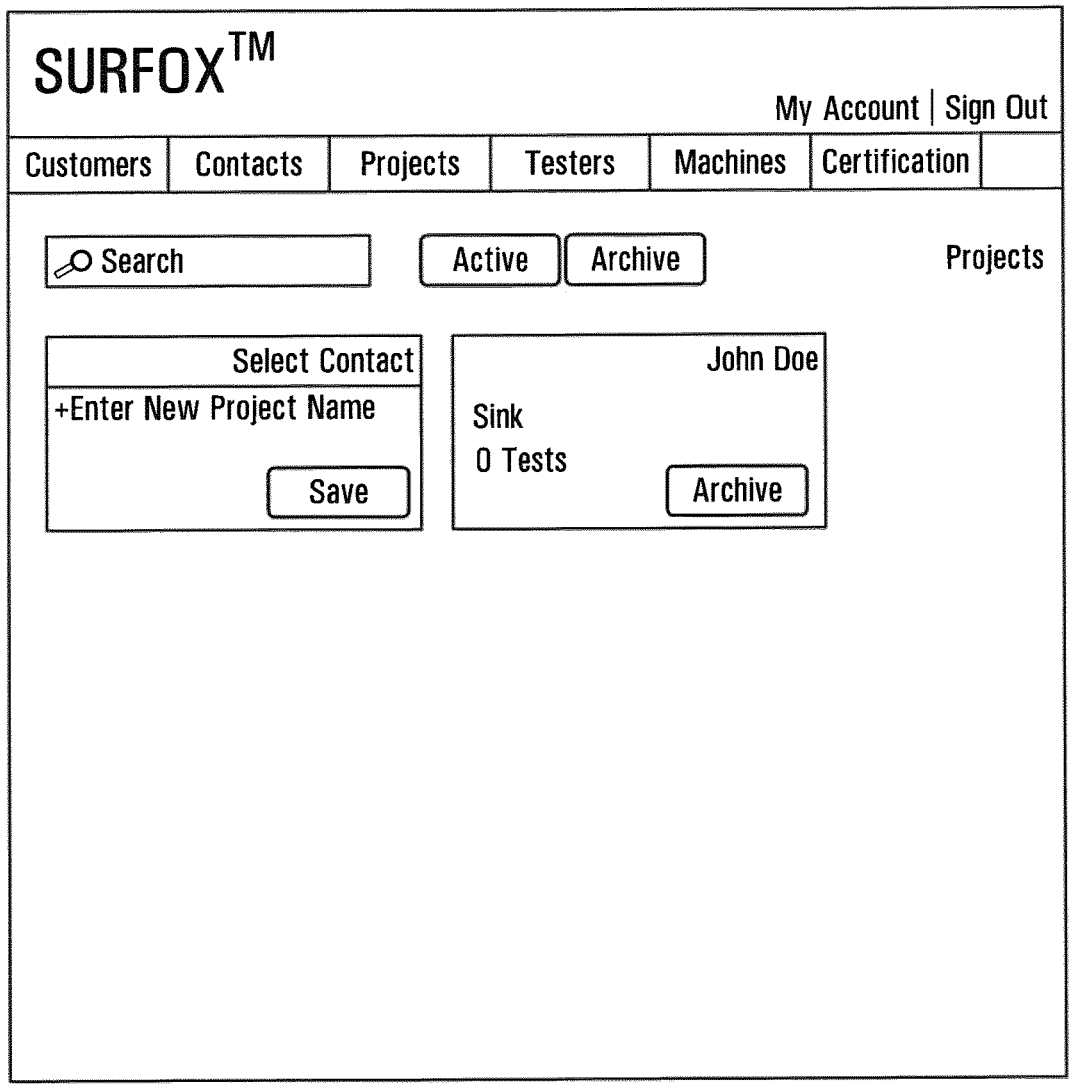

The welder then proceeds to add the customer to the management system 150 (as the customer in this example is not already stored in the management system 150). FIG. 17 illustrates a screenshot of the tablet after the customer "Sink Sellers Co." has been added. Once the customer has been added a contact for the customer is added next, in this case the contact's name is "John Doe". FIG. 18 illustrates a screenshot of the tablet after the contact John Doe has been added. Then the welder creates a new project titled "Sink". FIG. 19 illustrates a screenshot of the tablet after the project Sink has been added. Then the welder clicks on the Sink project and can then proceed to add additional information such as a description and the type of stainless steel grade that is used. FIG. 20 illustrates a screenshot of the GUI implemented on the tablet after a description and stainless steel grade has been added to the project Sink. It will be appreciated that after each of the aforementioned stages of information being entered into the tablet by the welder, such information is saved to the database 153 of the management system 150.

Figure 21:
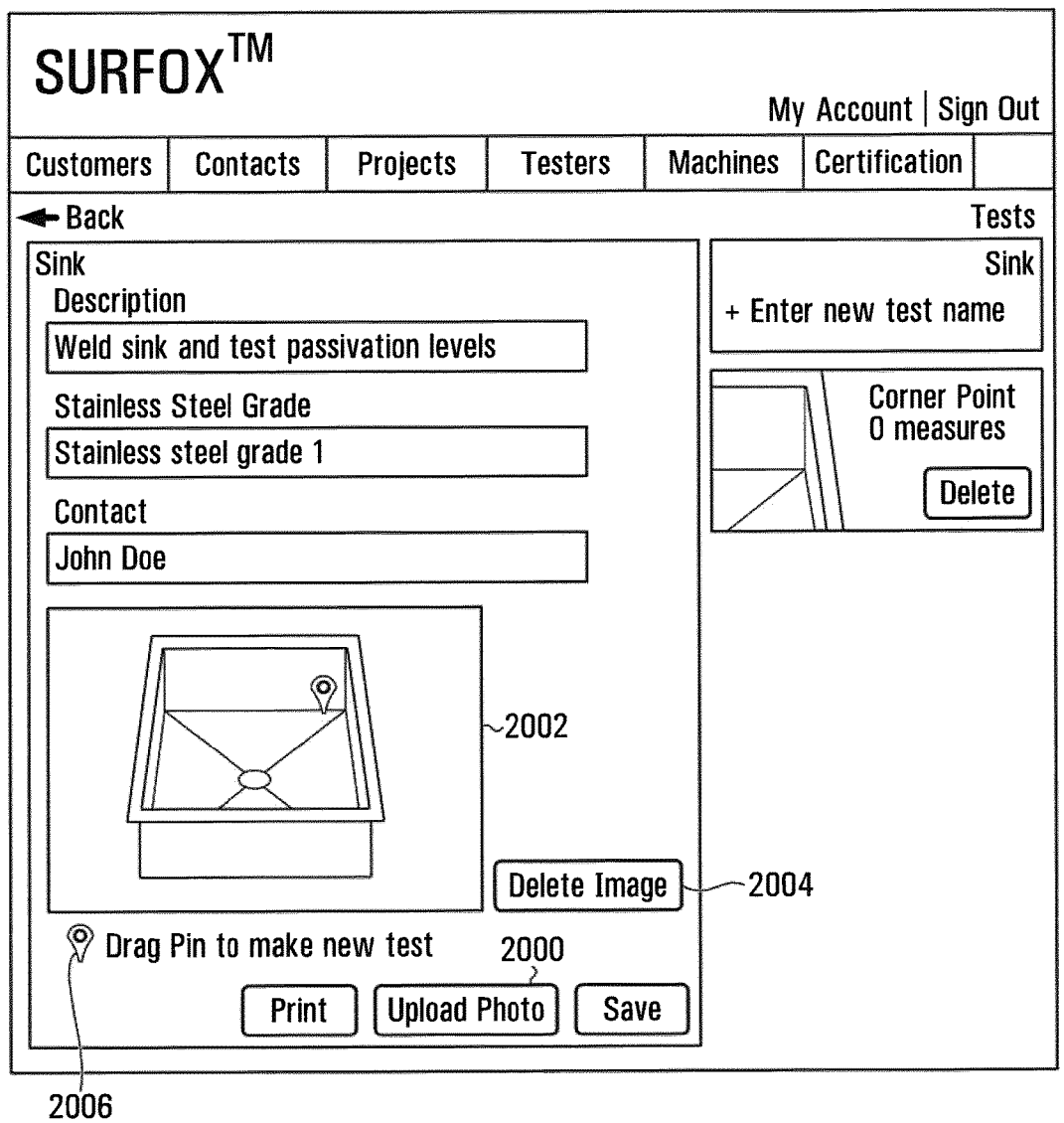

The welder then takes a picture with the tablet of the sink and uploads the picture such that it is saved to the database 153 of the management system 150. This operation is performed by clicking on a control that enables the camera on the tablet, allowing the welder to take a picture of the sink, which is then shown in the picture workspace 2002 of the GUI. FIG. 21 shows the picture of the sink in the workspace 2002. Note that the GUI provides some control components to manipulate the image, such as control 2004 allowing deletion of the image, for instance.

As FIG. 21 further shows, the GUI provides control component 2006 allowing placing markers on the image in the workspace 2002 that can be associated with passivation measurements. In this fashion, a user looking at the passivation measurement record, can readily see at which locations the passivation measurements were taken and what they where.

The operation of the control 2006 by the welder will create a new marker and is dragged to the location of the workpiece in the image workspace at which a measurement is to be taken. —Once the marker is placed at the desired location, the welder takes a passivation measurement. —The software executed on the tablet and that implements the passivation measurement processing entity 100 will then associate the image file showing the workpiece, the marker on the image and the passivation measurement.

The same operation is performed with additional passivation measurements. The welder activates the control 2006 to generate a new marker and drags this marker to a desired location in the image. The passivation measurement made after the new marker is set and that measurement is associated with the new marker. —That step is repeated as many times as desired to fully measure the passivation of the workpiece.

Note that the software is not constrained to work with a single image of the workpiece. A number of images can be used throughout the passivation measurement process. As the welder is done with an image, he/she clicks the control 2000 to upload the image in the workspace 2002 along the data relating to the passivation measurements and the markers.

Alternatively, the markers can be placed on the image of the workpiece all in succession and before any passivation measurement is taken. This allows the welder to create the passivation test map on the workpiece that will be used later for the actual measurements.

When the measurement operation is run, the GUI indicates to the welder the first location at which a measurement is to be taken. That location is one of the markers previously placed on the image. Different strategies can be used to distinguish the active marker (the one at which a measurement is to be taken) from the passive markers. For example, only the active marker can be shown in the image, while the passive markers are hidden. Alternatively, the active marker is highlighted to distinguish it from the passive markers.

When a passivation measurement is received it is associated with the active marker. Next, the software will make active the next marker in the sequence to show to the welder where to take the measurement. The process repeats itself until all the markers have been activated.

The sequence in which the markers are activated can be the same sequence in which the markers have been placed in the workspace 2002.

Similarly, the dynamic sequencing through the markers can also be obtained by loading a workpiece profile from the management system 150. —The workpiece profile contains the graphical representation of the workpiece and also conveys a plurality of locations on the workpiece at which a passivation measurement is to be made, including also the sequencing information.

The approach, which consists of sequentially activating markers to take the measurements, is more advantageous than alternating between creating one and taking a measurement because between measurements, the welder needs to manipulate the tablet, which is not allows practical.

The information that is being input into the GUI is ultimately transferred to the management system 150. —Essentially, the information transferred conveys the graphical representation of the workpiece, the markers and the associated passivation information. The specific manner of transferring the information is not critical. The information can be transferred all at once, when the passivation testing is completed or it can be transferred periodically, as new information is input in the GUI, such as for instance when a new passivation measurement is made or when a new marker is placed in the workspace 2002.

Figure 22:
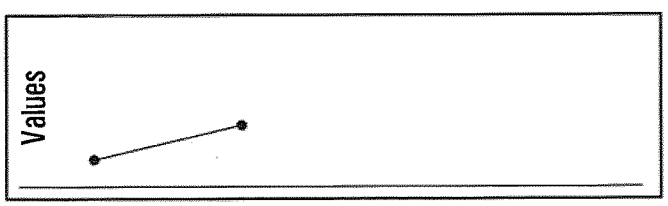

An example of passivation results recorded on the tablet is shown at FIG. 22. Two measurements have been made in association with a certain marker. At the time of the first measurement (Jul. 2, 2014 at 3:00 PM) a passivation reading of +0.8 V is obtained. As the level of passivation can grow over time, the welder sets up a notification to remind him to take a passivation measurement 24 hours later. The next day (Jul. 3, 2014 at 3:45 PM) the welder takes a second measurement at the same test point and obtains a passivation reading of +1.2 V.

The notification feature is managed through the control 2010 that allows the welder to set up reminders for performing additional measurements in connection with a certain marker, a sub-set of markers or all the markers. —Essentially, the software is configured to associate notifications with one or more of the plurality of passivation measurements. The control is activated by clicking on "+ Add Notification" and then by specifying a time period for the notification. —A default value for the time period could be 24 hours but the welder can modify that time period, by extending it or shortening it. When the notification period expires, the GUI will show a message to remind the welder to re-test the workpiece at one or more locations.

When an individual location is to be tested, the message displays the image of the workpiece along with the marker activated at the location at which the test is to be made. The new passivation measurement results are then added to the record. When multiple notifications have been set, the markers associated with the notifications are sequentially activated to prompt the welder to make the measurements at the respective locations on the workpiece.

Note that the software can include a wizard to prompt the welder to set up a notification for re-test on the basis of the passivation results received. For instance, when a result shows insufficient passivation for a particular location, the logic can show a message to the user suggesting to set-up a notification for that location. Alternatively, the wizard can automatically set-up notifications by performing an analysis of the set of measurements received. —The analysis includes comparing the passivation measurements to a threshold and if any of the locations measured are below the threshold then a notification is set up only for those locations. Accordingly, the notification control 2010 is automatically pre-populated with notifications for the locations of the workpiece that have not demonstrated a sufficient passivation. —This approach simplifies the notifications set-up as it avoids manually inputting an entry for each location to be re-tested.

Ultimately, when the welder is satisfied with the level of passivation and the welder then delivers the sink to Sink Seller Co. A user at the viewing computing entity 170, such as an employee of Sink Seller Co., then views the passivation measurement results to see which locations of the sink were tested and the measured level of passivation.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention.

The invention claimed is:

1. Computer readable storage device encoded with non-transitory software for execution by a Central Processing Unit (CPU), the software configured to:

a) communicate with a remote passivation measurement device to receive from the passivation measurement device passivation measurements;
b) implement a Graphical User Interface, including:
(1) a workspace to hold a graphical representation of a workpiece comprising at least one weld susceptible to disrupt a protective oxide layer on the workpiece;
(2) the workspace configured to display one or more markers, each marker indicative of a location on the weld with which a passivation measurement is to be associated;
(3) in response to reception of a passivation measurement from the remote passivation measurement device, associating the passivation measurement with the marker; and
wherein the software is configured to generate a notification to a user to retest the passivation of the workpiece at a location associated with a particular one of the markers, after a certain time period has expired, the time period being of sufficient length to allow the protective oxide layer on the workpiece to develop.

2. Computer readable storage device as defined in claim 1, wherein the GUI includes a control component responsive to user input to place a marker at a selected location of the graphical representation of the weld of the workpiece.

3. Computer readable storage device as defined in claim 2, wherein the control component is responsive to multiple user inputs to place a plurality of markers at selected locations of the graphical representation of the weld of the workpiece.

4. Computer readable storage device as defined in claim 1, wherein the software is configured to communicate with a remote server arrangement to receive from the server arrangement workpiece information, the workpiece information conveying a plurality of locations on the workpiece at which a passivation measurement is to be made.

5. Computer readable storage medium as defined in claim 1, wherein the GUI has an input object allowing a user to set a time period for issuance of the notification to retest the passivation of the workpiece at the location associated with the particular one of the markers.

6. Computer readable storage device as defined in claim 1, wherein the passivation measurement device sends the passivation measurements wirelessly.

7. Computer readable storage device as defined in claim 1, wherein the software is configured to perform a validation procedure to validate the operation of the passivation measurement device.

8. Computer readable storage device as defined in claim 7, wherein the validation procedure includes checking a battery level of the passivation measurement device.

9. Computer readable storage device as defined in claim 7, wherein the validation procedure includes displaying on the GUI a prompt asking a user of the passivation measurement device to confirm that a sensing tip of the passivation measurement device is saturated with liquid.

10. Computer readable storage device as defined in claim 7, wherein the validation procedure includes displaying on the GUI a prompt asking a user of the passivation measurement device to confirm that a sensing tip of the passivation measurement device is clean.

11. Computer readable storage device as defined in claim 7, wherein the validation procedure includes displaying on the GUI a prompt asking a user of the passivation measurement device to make a passivation measurement on a negative reference plate.

12. Computer readable storage device as defined in claim 7, wherein the validation procedure includes displaying on the GUI a prompt asking a user of the passivation measurement device to make a passivation measurement on a positive reference plate.

13. Computer readable storage medium as defined in claim 7, wherein the software is configured to request the user to run the validation procedure periodically.

14. Computer readable storage medium as defined in claim 7, wherein the software is configured to prevent capture of passivation measurement when no validation procedure has not been performed over a predetermined time period.

15. Computer readable storage medium as defined in claim 14, wherein the predetermined time period is 24 hours.

16. Computer readable storage medium as defined in claim 14, wherein the software is further configured to send a message to a remote server arrangement, the message conveying passivation measurements associated with data identifying the respective locations of the workpiece associated with the measurements.

17. Computer readable storage medium as defined in claim 1, configured to associate a plurality of passivation measurements in connection with a particular one of the markers.

* * * * *